US012430170B2

(12) United States Patent
Heckey et al.

(10) Patent No.: US 12,430,170 B2
(45) Date of Patent: Sep. 30, 2025

(54) QUANTUM COMPUTING SERVICE WITH QUALITY OF SERVICE (QoS) ENFORCEMENT VIA OUT-OF-BAND PRIORITIZATION OF QUANTUM TASKS

(71) Applicant: Amazon Technologies, Inc., Seattle, WA (US)

(72) Inventors: Jeffrey Paul Heckey, Seattle, WA (US); Saravanakumar Shanmugam Sakthivadivel, White Plains, NY (US); Derek Bolt, Seattle, WA (US); Jon-Mychael Allen Best, Seattle, WA (US); Ravi Kiran Chilakapati, Seattle, WA (US); Christian Bruun Madsen, Longmont, CO (US); Eric M. Kessler, New Rochelle, NY (US)

(73) Assignee: Amazon Technologies, Inc., Seattle, WA (US)

( * ) Notice: Subject to any disclaimer, the term of this patent is extended or adjusted under 35 U.S.C. 154(b) by 601 days.

(21) Appl. No.: 17/491,140

(22) Filed: Sep. 30, 2021

(65) Prior Publication Data
US 2023/0110628 A1    Apr. 13, 2023

(51) Int. Cl.
*G06F 9/50* (2006.01)
*G06F 9/48* (2006.01)
*G06N 10/00* (2022.01)

(52) U.S. Cl.
CPC ........... *G06F 9/4887* (2013.01); *G06N 10/00* (2019.01)

(58) Field of Classification Search
CPC ............................. G06F 9/4887; G06N 10/00
(Continued)

(56) References Cited

U.S. PATENT DOCUMENTS 5,937,205 A * 8/1999 Mattson .............. G06F 13/1642
710/41
6,741,585 B1   5/2004 Munoz et al.
(Continued)

FOREIGN PATENT DOCUMENTS

CN    113780733 A * 12/2021
EP    1701259         9/2006
(Continued)

OTHER PUBLICATIONS

Puneet Bakshi, "Using Digital Tokens to Improve Amortized Performance of eSign", Aug. 12, 2018, IEEE, https://ieeexplore.ieee.org/abstract/document/8511876 (Year: 2018).*
(Continued)

*Primary Examiner* — April Y Blair
*Assistant Examiner* — Ross Michael Vincent
(74) *Attorney, Agent, or Firm* — Alexander A. Knapp; Kowert, Hood, Munyon, Rankin & Goetzel, P.C.

(57) ABSTRACT

A quantum computing service includes a quality of service (QOS) and out-of-band prioritization module. The QoS and out-of-band prioritization module enforces QoS guarantees for quantum tasks and quantum jobs submitted to the quantum computing service while allowing for processing of the quantum jobs and quantum tasks based on QoS guarantees and not necessarily in an order in which the quantum jobs or quantum tasks are received. Also, the QoS and out-of-band prioritization module determines updated priorities out-of-band based on quantum resource usage information for previously executed quantum tasks such that submittal of pending quantum tasks is not delayed in while update priorities are being determined.

20 Claims, 17 Drawing Sheets

(58) Field of Classification Search
USPC .......................................................... 718/103
See application file for complete search history.

(56) References Cited

U.S. PATENT DOCUMENTS

| | | | |
|---|---|---|---|
| 7,484,091 B2 | 1/2009 | Bade et al. | |
| 7,996,836 B1 | 8/2011 | McCorkendale et al. | |
| 8,032,899 B2 | 10/2011 | Archer et al. | |
| 8,127,292 B1 | 2/2012 | Dobrovolskiy et al. | |
| 8,201,161 B2 | 6/2012 | Challener et al. | |
| 8,239,557 B2 | 8/2012 | McCune et al. | |
| 8,433,802 B2 | 4/2013 | Head et al. | |
| 8,514,868 B2 | 8/2013 | Hill | |
| 8,706,798 B1* | 4/2014 | Suchter | H04L 47/83 709/224 |
| 9,323,552 B1 | 4/2016 | Adogla et al. | |
| 9,361,145 B1 | 6/2016 | Wilson et al. | |
| 9,485,323 B1 | 11/2016 | Stickle et al. | |
| 9,774,489 B1 | 9/2017 | Gupta | |
| 9,979,694 B2 | 5/2018 | Brandwine et al. | |
| 10,095,537 B1 | 10/2018 | Neogy et al. | |
| 10,482,413 B2 | 11/2019 | Paterra et al. | |
| 10,498,611 B1 | 12/2019 | Kloberdans et al. | |
| 10,831,519 B2 | 11/2020 | Faulhaber, Jr. et al. | |
| 11,175,971 B1 | 11/2021 | Lee | |
| 11,526,385 B1* | 12/2022 | Mannar | G06F 9/5083 |
| 11,605,016 B2 | 3/2023 | Heckey et al. | |
| 11,605,033 B2 | 3/2023 | Bolt et al. | |
| 11,650,869 B2 | 5/2023 | Heckey et al. | |
| 11,704,715 B2 | 7/2023 | Kasprowicz et al. | |
| 11,775,855 B2 | 10/2023 | Richardson | |
| 12,013,845 B1 | 6/2024 | Kavali | |
| 2005/0013280 A1 | 1/2005 | Buddhikot et al. | |
| 2005/0229151 A1* | 10/2005 | Gupta | G06Q 10/06 717/101 |
| 2005/0251806 A1 | 11/2005 | Auslander et al. | |
| 2008/0244553 A1 | 10/2008 | Cromer et al. | |
| 2010/0070970 A1 | 3/2010 | Hu et al. | |
| 2011/0075667 A1 | 3/2011 | Li et al. | |
| 2011/0131443 A1 | 6/2011 | Laor et al. | |
| 2014/0208413 A1 | 7/2014 | Grobman et al. | |
| 2015/0160884 A1 | 6/2015 | Scales et al. | |
| 2016/0026573 A1 | 1/2016 | Jacobs et al. | |
| 2016/0077845 A1 | 3/2016 | Earl et al. | |
| 2016/0170781 A1 | 6/2016 | Liguori et al. | |
| 2016/0170785 A1 | 6/2016 | Liguori et al. | |
| 2017/0300354 A1 | 10/2017 | Dalal et al. | |
| 2017/0366606 A1 | 12/2017 | Ben-Shaul et al. | |
| 2018/0217951 A1* | 8/2018 | Benisty | G06F 13/1642 |
| 2018/0260125 A1 | 9/2018 | Botes et al. | |
| 2019/0130327 A1* | 5/2019 | Carpenter | G06F 9/45558 |
| 2019/0303309 A1* | 10/2019 | Sahoo | H04L 47/6215 |
| 2020/0026564 A1* | 1/2020 | Bahramshahry | G06Q 10/06316 |
| 2020/0034170 A1 | 1/2020 | Chen | |
| 2020/0042349 A1* | 2/2020 | Jain | G06F 9/546 |
| 2020/0174836 A1* | 6/2020 | Gunnels | G06N 10/00 |
| 2022/0101164 A1* | 3/2022 | Majumdar | G06N 10/00 |
| 2022/0414517 A1 | 12/2022 | Sete | |
| 2023/0015315 A1 | 1/2023 | Vetter et al. | |
| 2023/0047145 A1* | 2/2023 | Alexeev | G06N 10/80 |
| 2023/0153155 A1 | 5/2023 | Krneta et al. | |
| 2023/0153219 A1 | 5/2023 | Krneta et al. | |
| 2023/0188335 A1 | 6/2023 | Lamas Linares | |
| 2024/0112062 A1 | 4/2024 | Shanmugam Sakthivadivel | |

FOREIGN PATENT DOCUMENTS

| | | |
|---|---|---|
| EP | 2557498 | 2/2013 |
| WO | 2019222748 | 11/2019 |
| WO | 2020047426 A1 | 3/2020 |
| WO | 2020108993 A1 | 6/2020 |

OTHER PUBLICATIONS

Keyan Cao, Yefan Liu, Gongjie Meng, and Qimeng Sun, "An Overview on Edge Computing Research", Apr. 12, 2020, IEEE, DOI: 10.1109/ACCESS.2020.2991734 (Year: 2020).*

Cao, Keyan ; "An Overview on Edge Computing Research" ; May 1, 2020 ; IEEE ; vol. 8 ; https://ieeexplore.ieee.org/abstract/document/9083958 (Year: 2020).*

Bakshi, Puneet ; "Using digital tokens to improve amortized performance of eSign" ; Aug. 12, 2018 ; IEEE ; https://ieeexplore.ieee.org/ abstract/document/8511876 (Year: 2018).*

Meng Zhang, Yipeng Fu, Jing Wang, Junsen Lai, "Research on task scheduling scheme for quantum computing cloud platform", Aug. 18, 2022, ICCBDC 2022, https://doi.org/10.1145/3555962.3555964 (Year: 2022).*

Gokul Subramanian Ravi, Kaitlin N. Smith, Prakash Murali, Frederic T. Chong, "Adaptive job and resource management for the growing quantum cloud", 2021, IEEE, DOI: 10.1109/QCE52317.2021.00047 (Year: 2021).*

U.S. Appl. No. 18/179,771, filed Mar. 7, Derek Bolt, et al.

M. Gross, et al., "A Serverless Cloud Integration for Quantum Computing," arXiv preprint arXiv:2107.02007. Jul. 5, 2021, pp. 1-8, Cornell University Library, Ithaca, NY.

Gor L. Markov, et al., "Quantum Supremacy is Both Closer and Farther than It Appears", arXiv:1807.10749v3, Sep. 26, 2048. pp. 1-32.

U.S. Appl. No. 16/196,723, filed Nov. 20, 2018, Anthony Nicholas Liguori, et al.

Ozgur Ulusoy, "Processing Real-Time Transactions in a Replicated Database System," 1994 Kluwer Academic Publishers, Boston, Revised Sep. 10, 1993, pp. 1-32.

Sergio Almeida, et al., "ChainReaction: a Causal+ Consistent Datastore based on Chain Replication," Eurosys'Apr. 15-17, 13, 2013, Prague, Czech Republic, Copyright 2013 ACM 978-1-4503-1994-2/13/04, pp. 85-98.

Scott Lystig Fritchie, "Chain Replication in Theory and in Practice," Erlang'10, Sep. 30, 2010, Baltimore, Maryland, USA. Copyright 2010 ACM 978-1-4503-0253-1/10/09, pp. 1-11.

Robbert van Renesse, et al., "Chain Replication for Supporting High Throughput and Availability," USENIX Association, OSDI 2004: 6th Symposium on Operating Systems Design and Implementation, pp. 91-104.

Philip A. Bernstein, et al., "Concurrency Control and Recovery in Database Systems," Addison-Wesley Publication Company, ISBN 0-201-10715-5, 1987, pp. 1-58.

Xen, "Dom0" downloaded Jun. 6, 2016 from http://wiki.xen.org/wiki/Dom0, last updated Mar. 29, 2015, pp. 1-2.

Amazon Web Services, "Amazon Elastic Compute Cloud: User Guide for Linux Instances," Latest Version update 2015, pp. 1-816.

IBM, General Information, Version 4, Release 3.0, Fifth Edition, Apr. 2002, pp. 1-101.

From Wikipedia, the free encyclopedia, "Hypervisor," downloaded Jun. 6, 2016 from https://en.wikipedia.org/wiki/Hypervisor, pp. 1-7.

Axel Buecker, et al., "Reduce Risk and Improve Security on IBM Mainframes: vol. 1 Architecture and Platform Security," Redbooks, IBM, Dec. 2014, pp. 1-308.

From Wikipedia, the free encyclopedia, "VMware ESX," downloaded Jun. 6, 2016 from https://en.wikipedia.org/wiki/VMware_ESX, pp. 1-13.

From Wikipedia, the free encyclopedia, "Xen," downloaded from Jun. 6, 2016 from https://en.wikipedia.org/wiki/Xen, pp. 1-12.

Udo Steinberg, et al., "NOVA: A Microhypervisor-Based Secure Virtualization Architecture", ACM, EuroSys'10, Apr. 13-16, 2010, pp. 209-222.

Sangster, et al., TCG Published, Virtualized Trusted Platform Architecture Specification, Specification Version 1.0, Revision 0.26, Sep. 27, 2011, pp. 1-60.

Network Functions Virtualisation (NFV); NFV Security; Security and Trust Guidance, ETSI GS NFV-SEC 003, V1.1.2, downloaded by EP on Jun. 4, 2016, pp. 1-57.

Cong Xu, et al., "vSlicer: Latency-Aware Virtual Machine Scheduling via Differentiated-Frequency CPU Slicing", Purdue University, Purdue e-Pubs, 2012, pp. 1-14.

(56) References Cited

OTHER PUBLICATIONS

Amazon Web Services, "Amazon Elastic Compute Cloud: User Guide for Linux Instances," Latest Version update 2018, pp. 1-884.
Amazon Web Services, "Amazon Elastic Container Service: Developer Guide" API Version, Nov. 13, 2014, pp. 1-386.
Amazon Web Services, "AWS Lambda: Developer Guide" 2018, pp. 1-539.
AWS, "Annoucing Amazon EC2 Bare Metal Instances (Preview)", Retrieved from URL: https://aws.amazon.com/aboutaws/whats-new/2017/11/announcing-amazon-ec2-bare-metal-instances-preview/ on Jan. 15, 2018, pp. 1-4.
Brendan Gregg's Blog, "AWS EC Virtualization 2017: Introducing Nitro", Retrieved from URL: http://www.brendangregg.com/blog/2017-11-29/aws-ec2-virtualization-2017.html, pp. 1-11.
U.S. Appl. No. 16/698,698, filed Nov. 27, 2019, Derek Bolt, et al.
U.S. Appl. No. 16/698,674, filed Nov. 27, 2019, Jeffrey Paul Heckey, et al.
U.S. Appl. No. 16/698,732, filed Nov. 27, 2019, Jeffrey Paul Heckey, et al.
U.S. Appl. No. 16/698,737, filed Nov. 27, 2019, Christopher Kasprowicz.
U.S. Appl. No. 17/491,190, dated Sep. 30, 2021, Yunong, Shi.
International Search Report and Written Opinion mailed Oct. 16, 2023 in PCT/US2022/077008, Amazon Technologies, Inc., pp. 1-14.

\* cited by examiner

QUANTUM COMPUTING SERVICE WITH QUALITY OF SERVICE (QoS) ENFORCEMENT VIA OUT-OF-BAND PRIORITIZATION OF QUANTUM TASKS

BACKGROUND

Quantum computing utilizes the laws of quantum physics to process information. Quantum physics is a theory that describes the behavior of reality at the fundamental level. It is currently the only physical theory that is capable of consistently predicting the behavior of microscopic quantum objects like photons, molecules, atoms, and electrons.

A quantum computer is a device that utilizes quantum physics to allow one to write, store, process and read out information encoded in quantum states, e.g., the states of quantum objects. A quantum object is a physical object that behaves according to the laws of quantum physics. The state of a physical object is a description of the object at a given time.

In quantum physics, the state of a two-level quantum system, or simply, a qubit, is a list of two complex numbers whose squares sum up to one. Each of the two numbers is called an amplitude, or quasi-probability, and their squared absolute values are probabilities that a measurement of the qubit results in zero or one. A fundamental and counterintuitive difference between a probabilistic bit (e.g., a classical zero or one bit) and the qubit is that a probabilistic bit represents a lack of information about a two-level classical system, while a qubit contains maximal information about a two-level quantum system.

Quantum computers are based on such quantum bits (qubits), which may experience the phenomena of "superposition" and "entanglement." Superposition allows a quantum system to be in multiple states at the same time. For example, whereas a classical computer is based on bits that are either zero or one, a qubit may be both zero and one at the same time, with different probabilities assigned to zero and one. Entanglement is a strong correlation between quantum systems, such that the quantum systems are inextricably linked even if separated by great distances.

A quantum algorithm comprises a reversible transformation acting on qubits in a desired and controlled way, followed by a measurement on one or multiple qubits. For example, if a system has two qubits, a transformation may modify four numbers; with three qubits this becomes eight numbers, and so on. As such, a quantum algorithm acts on a list of numbers exponentially large as dictated by the number of qubits. To implement a transform, the transform may be decomposed into small operations acting on a single qubit, or a pair of qubits, as an example. Such small operations may be called quantum gates and a specific arrangement of the quantum gates implements a quantum circuit.

There are different types of qubits that may be used in quantum computers, each having different advantages and disadvantages. For example, some quantum computers may include qubits built from superconductors, trapped ions, semiconductors, photonics, etc. Each may experience different levels of interference, errors and decoherence. Also, some may be more useful for generating particular types of quantum circuits or quantum algorithms, while others may be more useful for generating other types of quantum circuits or quantum algorithms. Also, costs, run-times, error rates, availability, etc. may vary across quantum computing technologies.

Figure 1:
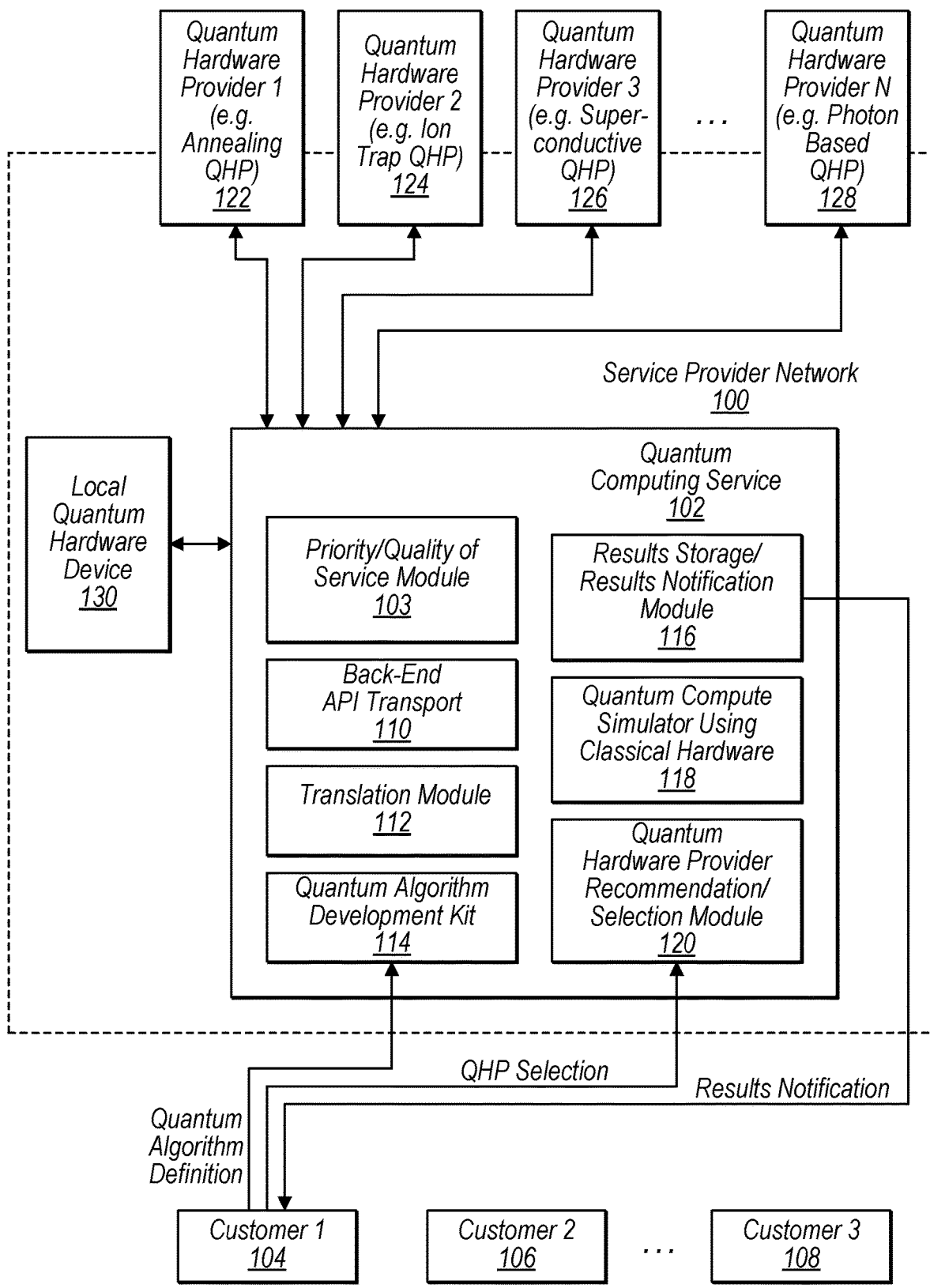
FIG. 1 illustrates a quantum computing service of a service provider network that enables customers to access quantum computers that use multiple quantum computing technologies, wherein the quantum computing service includes a quality of service (QOS) and out-of-band prioritization module that provides out-of-band prioritization of quantum tasks, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for providing quantum computing services to customers and enabling customers to seamlessly use one or more quantum computing technologies. Additionally, the disclosure relates to a fair, scalable, and auditable technique for prioritizing quantum tasks to be executed on behalf of customers, wherein the quantum tasks are prioritized based, at least in part, on quality of service (QOS) guarantees made for quantum jobs, of which the quantum tasks are a part, according to some embodiments.

In some embodiments, a system includes a service provider network comprising one or more computing devices that are configured to implement a quantum computing service. The system may also include a first edge computing device of the service provider network located at a location of a first quantum hardware provider and one or more additional edge computing devices of the service provider network located at respective locations of one or more additional quantum hardware providers. In some embodiments, the quantum computing service may additionally, or alternatively, be connected to one or more quantum hardware devices located within the service provider network. For example, the quantum computing service may provide a customer access to internal quantum processing units (QPUs) and/or external quantum processing units of quantum hardware providers (QPUs of QHPs). The one or more computing devices that implement the quantum computing service are configured to receive, from a customer of the quantum computing service, a definition of a quantum computing object to be executed and select at least one of the quantum hardware providers to execute the quantum computing object, or select an internal QPU to execute the quantum computing object. In some embodiments, the quantum computing object may be a quantum task or a quantum job, such as a task or job defined using a problem-domain interface of a quantum algorithm development kit; a quantum algorithm defined using a quantum algorithm development kit of the quantum computing service or provided by a customer; or a quantum circuit defined using the quantum algorithm development kit of the quantum computing service, or supplied by a customer. In some embodiments, a quantum job may comprise a plurality of quantum tasks.

For example, a hybrid job which comprises both quantum processing portions and classical processing portions may be a quantum job that requires multiple quantum tasks to be executed. In some embodiments, a solo quantum task, as referred to herein, may include a single quantum circuit that is to be executed on a given QPU. In some embodiments, a quantum program may define a quantum job, wherein the quantum program includes multiple quantum circuits to be executed on one or more QPUs. For example, a quantum program may include a single quantum circuit or may include multiple quantum circuits. For example, in some embodiments, a quantum program may include logical loops that instruct a particular quantum circuit to be implemented based on one or more conditions, such as a "for loop", "if loop", "while loop", etc. In addition, in some embodiments, a quantum program may instruct implementation of a parametric quantum circuit. In such examples as described above, execution of an individual quantum circuit of a quantum program may be referred to herein as a quantum task and execution of the quantum program as a whole may be referred to herein as a quantum job.

In some embodiments, the one or more computing device that implement the quantum computing service may further be configured to provide the customer with a recommendation in regard to which quantum hardware provider or internal QPU to use to execute the customer's quantum computing object, and the selection of an internal QPU or the quantum hardware provider to execute the quantum computing object may be based on the recommendation and/or other input received from the customer regarding which type of quantum hardware to select to execute the customer's quantum computing object. In some embodiments, the recommendation may include estimated costs, error rates, run-times, etc. associated with executing the quantum computing object on quantum computers of respective ones of the quantum hardware providers or an internal QPU. For example, the recommendation may include various quality of service (QOS) guarantees available for execution of the quantum computing object at the various quantum hardware providers and/or at the internal QPU.

The one or more computing devices implementing the quantum computing service are further configured to submit a quantum task comprising a quantum circuit corresponding to at least a portion of the quantum computing object to a selected one or more of the quantum hardware providers via a given edge computing device located at the respective location of the selected quantum hardware provider, receive results of executing the quantum circuit on a quantum computer of the selected quantum hardware provider, store the results of executing the quantum circuit, and provide a notification to the customer that execution of the quantum computing object has been completed. However, when an internal QPU is selected for execution of the quantum task, the quantum task may be submitted directly to a queue for the internal QPU. For example, it may not be necessary to transport the quantum task, via back-end API transport, to an edge computing device for submission of a quantum task to an internal QPU.

The quantum computing service is also configured to translate the quantum computing object into a selected quantum circuit format for a particular quantum computing technology used by the selected quantum hardware provider or internal QPU, wherein the selected quantum circuit format for the particular quantum computing technology is one of a plurality of quantum circuit formats for a plurality of different quantum computing technologies supported by the quantum computing service.

To translate the quantum computing object into the selected quantum circuit format, the one or more computing devices that implement the quantum computing service are configured to identify portions of the quantum computing object corresponding to quantum operators in an intermediate representation in which the quantum object was submitted by the customer, substitute the quantum operators of the intermediate representation with quantum operators of the quantum circuit format of the particular quantum computing technology, and perform one or more optimizations to reduce an overall number of quantum operators in a translated quantum circuit that is a translated version of the received quantum computing object.

Additionally, the quantum computing service is configured to provide the translated quantum circuit for execution at a quantum hardware provider or internal QPU that uses the particular quantum computing technology; receive, from the quantum hardware provider or internal QPU, results of the execution of the translated quantum circuit; and provide a notification to a customer of the quantum computing service that the quantum computing object has been executed.

In some embodiments, computing devices of a provider network that implement a quantum computing service are further configured to implement a priority access control plane for the quantum computing service and one or more quantum task queues for the quantum computing service. The priority access control plane may enforce quality of service guarantees for quantum jobs submitted to the quantum computing service by customers of the quantum computing service. Additionally, the priority access control plane may load balance execution of quantum tasks such that solo-quantum tasks do not remain in the quantum task queue for more than a threshold amount of time without being submitted to a QHP or internal QPU for execution. Additionally, or alternatively, the priority access control plane may prioritize completion of a given quantum job, once execution of the given quantum job has commenced, over commencement of other quantum jobs submitted to the quantum computing service. For example, the priority access control plane may prioritize completing a first quantum job that has commenced over starting execution of a next quantum job. Though in some embodiments, a priority access control plane may commence execution of more than one quantum job at a time, wherein quantum resources are allocated to the concurrently executing quantum jobs based on quality of service (QOS) guarantees associated with the respective quantum jobs.

As explained in more detail below, since quantum hardware devices, such as an internal QPU of a quantum computing service or a QPU of an external quantum hardware provider, experience drift over time relative to an initial calibration state, allowing extended amounts of time to lapse between execution of sequential quantum tasks of a quantum job may result in less reliable results. Also, customers may be willing to tolerate a later scheduled start time/start date for the customer's quantum job, but may be less satisfied with a lengthy duration for completion of the quantum job once commenced. In some embodiments, the priority access control plane may assign respective priorities to respective quantum tasks included in a quantum task queue of the quantum computing service based on quality of service (QOS) guarantees for a quantum job of which the quantum tasks are a part and/or based on a desired load balance between quantum job type quantum tasks and solo quantum tasks that are not part of a larger quantum job.

The one or more quantum task queues may be queues comprising quantum tasks waiting to be transported, via a back-end API transport, to an edge computing device at a QHP location for execution on a QPU of the QHP. Alternatively, or additionally, the one or more quantum task queues may be queues for quantum tasks waiting to be submitted to an internal QPU of the quantum computing service for execution. In some embodiments, a quantum task queue may include quantum tasks that are waiting to be submitted to a plurality of types QHPs and/or internal QPUs, wherein different ones of the QHPs or QPUs utilize different interfaces for locally queuing quantum tasks at the QHP or QPU for execution.

The priority access control plane may determine and/or assign the relative priorities to the quantum tasks out-of-band such that a time required to determine and assign the priorities does not delay submittal of a next quantum task in the quantum task queue. For example, instead of determining an updated priority prior to submitting a next quantum task in the quantum task queue in response to an indication of availability for execution of the next quantum task, the priority access control plane may submit a next quantum task in the quantum task queue immediately upon indication of availability for execution of the next quantum task based on a previously determined priority that was determined based on execution information for one or more previously submitted quantum tasks. In some embodiments, the priority access control plane may use access tokens to assign priorities to quantum tasks in the one or more quantum task queues, wherein the access tokens have a one-to-many relationship with quantum tasks. For example, if an updated priority changes a priority of a given quantum job relative to other quantum jobs, the priority access control plane may change a priority of tokens with an ID for the given quantum job (or that are otherwise tied to the given quantum job). This may cause all quantum tasks for the given quantum job remaining in the one or more quantum task queues to assume the new updated priority without having to individually change priorities for each of the quantum tasks of the quantum job on a one-by-one basis.

In some embodiments, the quantum tasks may be of variable duration and actual amounts of quantum resources used to execute a previous quantum task of a quantum job may be used to determine a current performance of the quantum job relative to a quality of service (QOS) guarantee. For example, a QoS guarantee may stipulate that 30% of the quantum resources of a given QPU are to be allocated to executing the quantum job until the quantum job is complete. However, each individual quantum task may utilize more or fewer of the quantum resources of the QPU. For example, each quantum task may require a variable amount of time to complete based on: a number of shots to be performed (e.g., repeated executions and subsequent measurements of quantum circuit of the quantum task), a complexity of a quantum circuit for the quantum task, an amount of time required to implement the quantum circuit of the quantum task relative to a quantum circuit previously implemented on the QPU, quantum task depth, etc.

As an example, a first quantum task of a quantum job may utilize 20% of the resources of a QPU during a given resource utilization period, whereas a second quantum task may utilize 40% of the resources of the QPU during a second resource utilization period. If the QoS guarantee for the quantum job is 30%, the priority access control plane may increase prioritization of the next quantum task for the quantum job subsequent to execution of the first quantum task that only utilized 20% of the resources of the QPU (e.g., to drive the utilization to the 30% target), but may deprioritize execution of a next quantum task after execution of the second quantum task that utilized 40% of the resources of the QPU (which exceeded the 30% target by 10%). In this way, the priority access control plane may enforce the QoS guarantees for the quantum jobs submitted to the quantum computing service.

In some embodiments, a priority access control plane may implement dynamic scheduling of quantum tasks based on static targets of percentages of quantum resource utilizations. For example, a target QoS guarantee, such as 30% in the above example, may be static for a given quantum job. However, since each quantum task uses a variable (and hard to predict) amount of quantum resources, the priority of the quantum job may be dynamically updated relative to other quantum jobs that have commenced execution. Note that a quantum computing service may execute more than one quantum job in parallel. For example, if a first quantum job has a QoS target of 30%, a second quantum job has a QoS target of 20% and a third quantum job has a QoS target of 50% (all on the same QPU), all three quantum jobs may be commenced in parallel with the quantum resources of the QPU assigned to performing quantum tasks of the respective quantum jobs based on their respective QoS guarantees and respective histories of utilizing quantum resources.

In some embodiments, a priority access control plane may further load balance execution of job-type quantum tasks and solo quantum tasks. This may be done to ensure that job-type quantum tasks do not monopolize utilization of quantum computing resources to the exclusion of solo quantum tasks. For example, upon completion of a quantum job, a priority access control plane may determine if there are any solo quantum tasks in the quantum task queue with an age in the queue (e.g., amount of time in the queue) greater than a threshold age. If so, the priority access control plane may prioritize execution of the solo quantum tasks prior to commencing a next quantum job. For example, instead of adding additional tasks to the quantum task queue for the next quantum job, the priority access control plane may first submit the solo quantum tasks with the age greater than the threshold for execution at a QPU. In some embodiments, a priority access control plane may treat solo quantum tasks (potentially submitted by different customers) as belonging to a "solo task" job type, which may have an associated quality of service guarantee (QoS). For example, a solo-task job type may be assigned a 10% QoS guarantee, such that 10% of the quantum computing resources are allocated to executing solo quantum tasks.

As discussed above, updated priorities for the quantum tasks in the one or more quantum task queues are determined and assigned after completion of a given quantum task, such that the updating and assignment of new priorities is not in the critical path for submitting a next quantum task in the one or more quantum task queues for execution. For example, when capacity becomes available at a back-end API transport or local QPU queue to accept a next quantum task, a quantum task at a head of a given one of the one or more quantum tasks queues of the quantum computing service may be automatically submitted without waiting for an updated priority to be determined. However, when a quantum task is finished, other quantum tasks remaining in the one or more quantum task queues may have their respective priorities updated based on usage metrics received for the recently completed quantum task.

In some embodiments, a customer may select a QoS to be used for the customer's quantum job and/or quantum task. In some embodiments, a customer that is willing to pay a premium for a superior QoS guarantee may be allowed to have the customer's quantum job executed ahead of other customers that selected a lower QoS guarantee. Thus, quantum jobs are not necessarily executed in a first in first out (FIFO) order, but instead may be reprioritized based on relative QoS guarantees.

In some embodiments, utilization of quantum resources for purposes of enforcing a QoS guarantee may take into account utilization of various types of quantum resources, such as one or more of: execution time, task shots, task circuit size, number of qubits included in quantum circuit of task, number of quantum gates included in in quantum circuit of task, time since last execution of a quantum task of the quantum job, and/or other applicable metrics.

In some embodiments, similar circuits that require minimal switch over at a QPU may be prioritized to be executed sequentially. For example, in trapped ion type quantum hardware devices, efficient utilization of the quantum resource may be improved by reducing configuration changes between dissimilar quantum circuits. As another example, for super-conducting qubits, if parametric compilation can be performed once and a compiled parametric quantum circuit cached, the cached parametric circuit may be re-used, which is more efficient than spreading out the runs of the parametric circuit to let in other customers and potentially causing the compiled parametric circuit to be lost from the cache, wherein the parametric quantum circuit has to be re-compiled.

In some embodiments, dynamic learning, such as via a machine learning algorithm, may be used to determine how to update priorities for quantum tasks in the quantum task queue.

In some embodiments, a priority of service module as described herein may manage prioritization of quantum jobs and quantum tasks with regard to using other types of quantum resources, such as a quantum simulator implemented on classical computing hardware, a quantum compiler, etc.

Also, while various examples described herein are described in terms of the priority/quality of service module providing prioritization management for multiple QHPs, in some embodiments, a given QHP may partner with a quantum computing service in order to have a priority/quality of service module of the quantum computing service provide prioritization management support to the QHP with regard to prioritizing internally submitted quantum tasks and quantum jobs. For example, in some embodiments, a priority/quality of service module may be implemented on an edge computing device of a service provider network that is located at a QHP facility.

Example Quantum Computing Service

Quantum computers may be difficult and costly to construct and operate. Also, there are varying quantum computing technologies under development with no clear trend as to which of the developing quantum computing technologies may gain prominence. Thus, potential users of quantum computers may be hesitant to invest in building or acquiring a particular type of quantum computer, as other quantum computing technologies may eclipse a selected quantum computing technology that a potential quantum computer user may invest in. Also, successfully using quantum computers to solve practical problems may require significant trial and error and/or otherwise require significant expertise in using quantum computers.

As an alternative to building and maintaining a quantum computer, potential users of quantum computers may instead prefer to rely on a quantum computing service to provide access to quantum computers. Also, in some embodiments, a quantum computing service, as described herein, may enable potential users of quantum computers to access quantum computers based on multiple different quantum computing technologies and/or paradigms, without the cost and resources required to build or manage such quantum computers. Also, in some embodiments, a quantum computing service, as described herein, may provide various services that simplify the experience of using a quantum computer such that potential quantum computer users lacking deep experience or knowledge of quantum mechanics, may, never the less, utilize quantum computing services to solve problems.

Also, in some embodiments, a quantum computing service, as described herein, may be used to supplement other services offered by a service provider network. For example, a quantum computing service may interact with a classical computing service to execute hybrid algorithms. In some embodiments, a quantum computing service may allow a classical computer to be accelerated by sending particular tasks to a quantum computer for execution, and then further performing additional classical compute operations using the results of the execution of a quantum computing object on the quantum computer. For example, a quantum computing service may allow for the acceleration of virtual machines implemented on classical hardware in a similar manner as a graphics processing unit (GPU) may accelerate graphical operations that otherwise would be performed on a central processing unit (CPU).

In some embodiments, a quantum computing service may provide potential quantum computer users with access to quantum computers using various quantum computing technologies, such as quantum annealers, ion trap machines, superconducting machines, photonic devices, etc. In some embodiments, a quantum computing service may provide customers with access to at least three broad categories of quantum computers including quantum annealers, circuit-based quantum computers, and analog or continuous variable quantum computers. As used herein, these three broad categories may be referred to as quantum computing paradigms.

In some embodiments, a quantum computing service may be configured to provide simulation services using classical hardware based computing instances to simulate execution of a quantum circuit on a quantum computer. In some embodiments, a quantum computing service may be configured to perform general simulation and/or simulation that specifically simulates execution of a quantum circuit on a particular type of quantum computer of a particular quantum computer technology type or paradigm type. In some embodiments, simulation may be fully managed by a quantum computing service on behalf of a customer of the quantum computing service. For example, the quantum computing service may reserve sufficient computing capacity on a virtualized computing service of the service provider network to perform simulation without customer involvement in the details of managing the resources for the simulator.

In some embodiments, a quantum computing service may include a dedicated console that provides customers access to multiple quantum computing technologies. Furthermore, the quantum computing service may provide a quantum algorithm development kit that enables customers with varying levels of familiarity with quantum circuit design to design and execute quantum circuits. In some embodiments, a console of a quantum computing service may include various application programmatic interfaces (APIs), such as:

(Create/Delete/Update/Get/List) Simulator-Configuration-create, read, update, and delete (CRUD) operations for simulator configuration objects.
(Start/Cancel/Describe) Simulator-used to control each of the user-defined simulator instances.
(List/Describe) quantum processor units (QPUs)—retrieves quantum computer hardware information.
(Create/Cancel/List/Describe) Job-used to manage the lifecycle of a quantum job.
(Assign/Update/List) Quality of Service (QOS) guarantee-used to manage QoS guarantees for quantum jobs and/or quantum tasks.
(Create/Cancel/List/Describe) Task-used to manage the lifecycle of individual quantum tasks/quantum objects.

In some embodiments, a quantum algorithm development kit may include a graphical user interface, APIs or other interface to allow customers of a quantum computing service to define quantum objects, such as quantum tasks, algorithms or circuits, using the quantum algorithm development kit. In some embodiments, the quantum algorithm development kit may include an interface option that enables customers to share the quantum objects with other customers of the quantum computing service. For example, the quantum algorithm development kit may include a marketplace that allows customers to share or sell particular quantum objects with other customers. In some embodiments, the quantum algorithm development kit may include an interface element that allows customers to select a QoS to be applied for a quantum job or quantum tasks defined via the quantum algorithm development kit.

In some embodiments, a quantum computing service may include a public application programmatic interface (API) that accepts quantum objects submitted by a customer of the quantum computing service. In some embodiments, the quantum computing service may accept via the public API, or another API, instructions regarding a QoS guarantee to be used for one or more quantum jobs or quantum tasks, such as executing the quantum object received via the public API. Additionally, the quantum computing service may include a back-end API transport that is non-public. The back-end API transport may enable quantum circuits to be transported from a centralized location that implements the quantum computing service, such as one or more data centers of a service provider network, to an edge computing device at a particular quantum hardware provider location where the quantum circuit is to be executed. In some embodiments, quantum objects or quantum tasks may be executed using an internal QPU of the quantum computing service without using a back-end API transport to transport the quantum job or quantum task to an external quantum hardware provider location.

In some embodiments, results of the execution of a quantum circuit on a quantum computer at a quantum hardware provider location may be provided to the edge computing device at the quantum hardware provider location. The edge computing device may automatically transport the results to a secure storage service of the service provider network, where the customer can access the results using the storage service of the service provider network or via a console of the quantum computing service. Likewise, results of execution of a quantum circuit via an internal QPU may be accessed via the console of the quantum computing service.

In some embodiments, the results stored to the secure storage service may be seamlessly used by other services integrated into the service provider network, such as a machine learning service, a database service, an object-based storage service, a block-storage service, a data presentation service (that reformats the results into a more usable configuration), etc. For example, in some embodiments, a machine learning service may be used to optimize a quantum algorithm or quantum circuit. For example, the machine learning service may cause various versions of a quantum algorithm or quantum circuit to be run on a quantum computer via a quantum computing service. The machine learning service may also be provided access to results of running the quantum algorithms or quantum circuits. In some embodiments, the machine learning service may cause the quantum algorithms or quantum circuits to be run on various different quantum computing technology-based quantum computers. Based on the results, the machine learning service may determine one or more optimizations to improve the quantum algorithms or quantum circuits.

In some embodiments, a quantum computing service may support creating snapshots of results of executing a quantum circuit. For example, the quantum computing service may store snapshots of intermediate results of a hybrid algorithm or may more generally store snapshots of any results generated by executing a quantum circuit on a quantum computer. In some embodiments, an edge computing device at a hardware provider location may temporarily store results and may create snapshot copies of results stored on the edge computing device. The edge computing device may further cause the snapshot copies to be stored in an object-based data storage service of the service provider network. In some embodiments, snapshotting may not be performed, based on customer preferences.

FIG. 1 illustrates a quantum computing service of a service provider network that enables customers to access quantum computers that use multiple quantum computing technologies, wherein the quantum computing service includes a quality of service (QOS) and out-of-band prioritization module that provides out-of-band prioritization of quantum tasks, according to some embodiments.

Service provider network 100 includes quantum computing service 102. In some embodiments, service provider network 100 may include data centers, routers, networking devices, etc., such as of a cloud computing provider network. In some embodiments, customers 104, 106, and 108 and/or additional customers of service provider network 100 and/or quantum computing service 102, may be connected to the service provider network 100 in various ways, such as via a logically isolated connection over a public network, via a dedicated private physical connection, not accessible to the public, via a public Internet connection, etc.

In some embodiments, a quantum computing service 102 may include a quality of service (QOS) and out-of-band prioritization module 103, a quantum algorithm development kit 114, a translation module 112, and a quantum compute simulator using classical hardware 118.

Also, quantum computing service 102 is connected to quantum hardware providers 122, 124, 126, and 128. In some embodiments, quantum hardware providers 122, 124, 126, and 128 may offer access to run quantum objects on quantum computers that operate based on various different types of quantum computing technologies or paradigms, such as based on quantum annealing, ion-trap, superconductive materials, photons, etc.

Figure 8:
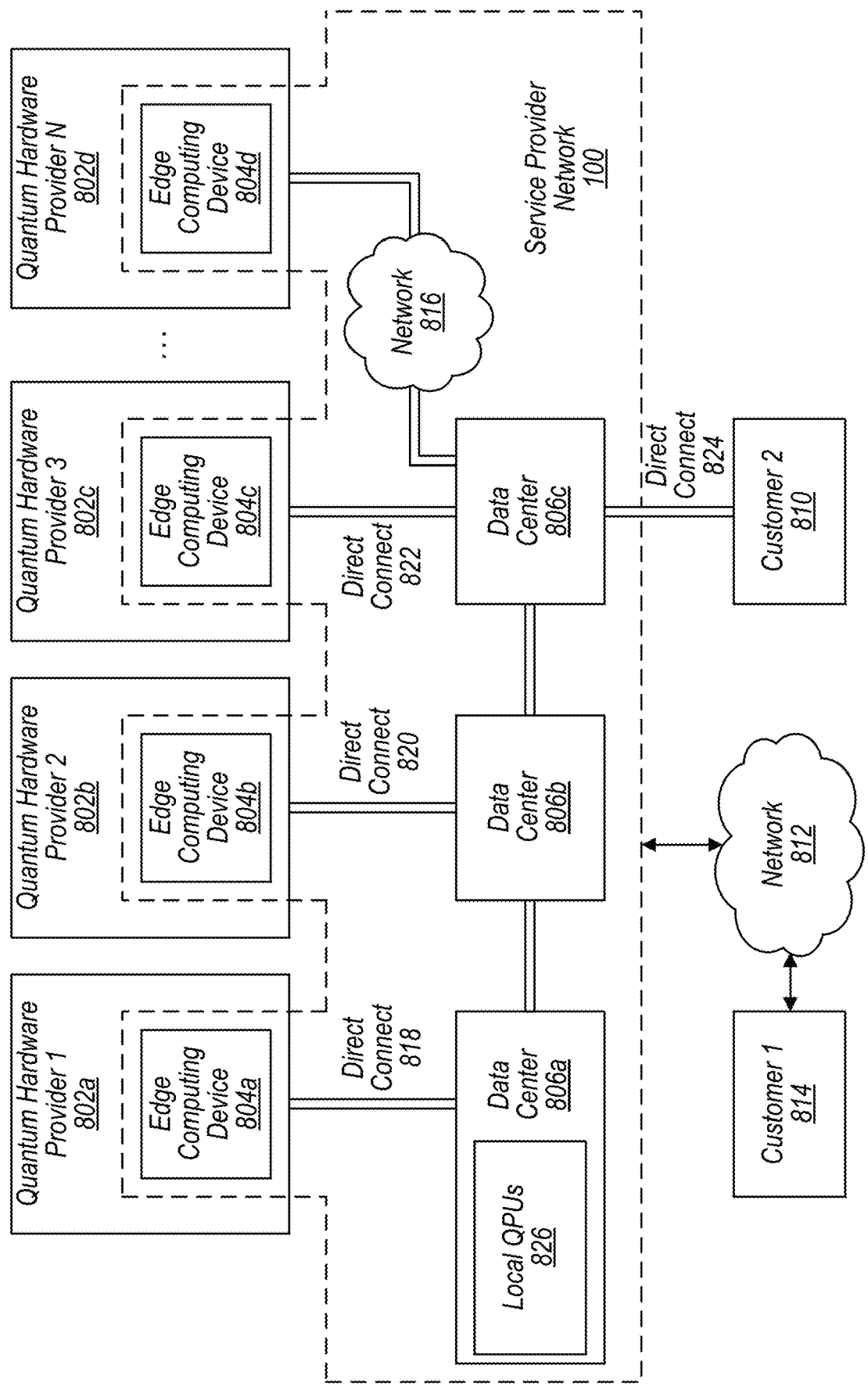
FIG. 8 illustrates edge computing devices of a quantum computing service physically located at quantum hardware provider locations, according to some embodiments.

As discussed in more detail in FIG. 8, in some embodiments, a service provider network 100 may be extended to include one or more edge computing devices physically located at quantum hardware provider locations, such as in a facility of quantum hardware providers 122, 124, 126, and 128. Physically locating an edge computing device of a service provider network 100 on premises at a quantum hardware provider facility may extend data security and encryption of the service provider network 100 into the quantum hardware providers 122, 124, 126, and 128 facilities, thus ensuring the security of customer data. Also, physically locating an edge computing device of a service provider network 100 on premises at a quantum hardware provider facility may reduce latency between a compute instance of the service provider network and a quantum computer located at the quantum hardware provider facility. Thus, some applications, such as hybrid algorithms that are sensitive to network latencies may be performed by quantum computing service 102, whereas other systems without co-located classical compute capacity at a hardware provider location may have too high of latencies to perform such hybrid algorithms efficiently.

In some embodiments, quantum computing service 102 includes one or more back-end API transport modules 110. In some embodiments, a back-end API transport module 110 may be primarily implemented on edge computing devices of the quantum computing service that are located at the quantum hardware provider locations (such as edge computing devices 804a, 804b, 804c, and 804d illustrated in FIG. 8). Also, in some embodiments, at least some of the back-end API transport functionality may be implemented on the one or more computing devices of the service provider network that implement the quantum computing service (such as computing devices in data center 806a, 806b, 806c illustrated in FIG. 8). In some embodiments, different quantum hardware providers may require different back-end API transport modules, which may further add variability to execution durations of quantum tasks. Some quantum hardware providers may accept quantum tasks over a network via an API such that it is not necessary for the provider network to locate an edge computing device at the quantum hardware provider's facility in order to submit quantum tasks. In some embodiments, some quantum hardware providers may follow a first in first out (FIFO) execution model for quantum tasks submitted for execution to the quantum hardware provider. Other quantum hardware providers may follow a batch execution model. In order to deal with these execution duration variabilities and to further deal with execution duration variability due to characteristics of various quantum tasks (e.g. number of shots, quantum circuit size, number of gates, time to switch between quantum circuits, etc.), a priority access control plane may order quantum tasks submitted to the back-end API transports for various quantum hardware providers in a prioritized order such that quality of service (QOS) guarantees and other scheduling rules are followed.

Quantum circuits that have been translated by translation module 112 may be provided to back-end API transport module 110 in order for the translated quantum circuits to be transported to a quantum computer at a respective quantum hardware provider location. In some embodiments, back-end API transport 110 may be a non-public API that is accessible by an edge computing device of service provider network 100, but that is not publicly available. In some embodiments, a quality of service (QOS) and out-of-band prioritization module 103 may manage which quantum tasks are submitted to the back-end API transport and in what order. In some embodiments, edge computing devices at the quantum hardware providers 122, 124, 126, and 128 may periodically ping a quantum computer service side interface to the back-end API transport 110 to determine if there are any quantum circuits (or batches of quantum circuits) waiting to be transported to the edge computing device. If so, the edge computing device may perform an API call to the back-end API transport 110 to cause the quantum circuit to be transported over a private connection to the edge computing device and scheduled for execution on a quantum computer. As discussed in more detail in FIGS. 12-13, the edge computing device may queue the quantum circuit for execution on a quantum computer of the quantum hardware provider where the edge computing device is located. Also, the edge computing device may have been configured with a quantum machine image that enables the edge computing device to interface with a scheduling application of the quantum hardware provider, where the edge computing device is located, in order to schedule a time slot on the quantum computer of the quantum hardware provider to execute the quantum circuit via the back-end API transport 110.

In some embodiments, results of executing the quantum circuit on the quantum computer at the quantum hardware provider location may be returned to the edge computing device at the quantum hardware provider location. The edge computing device and/or quantum computing service 102 may cause the results to be stored in a data storage system of the service provider network 100. In some embodiments, results storage/results notification module 116 may coordinate storing results and may notify a customer, such as customer 104, that the results are ready from the execution of the customer's quantum object, such as a quantum task, quantum algorithm, or quantum circuit. In some embodiments, results storage/results notification module 116 may cause storage space in a data storage service to be allocated to a customer to store the customer's results. Also, the results storage/results notification module 116 may specify access restrictions for viewing the customer's results in accordance with customer preferences.

In some embodiments, quantum compute simulator using classical hardware 118 of quantum computing service 102, may be used to simulate a quantum algorithm or quantum circuit using classical hardware. For example, one or more virtual machines of a virtual computing service may be instantiated to process a quantum algorithm or quantum circuit simulation job. In some embodiments, quantum compute simulator using classical hardware 118 may fully manage compute instances that perform quantum circuit simulation. For example, in some embodiments, a customer may submit a quantum circuit to be simulated and quantum compute simulator using classical hardware 118 may determine resources needed to perform the simulation job, reserve the resources, configure the resources, etc. In some embodiments, quantum compute simulator using classical hardware 118 may include one or more "warm" simulators that are pre-configured simulators such that they are ready to perform a simulation job without a delay typically involved in reserving resources and configuring the resources to perform simulation.

In some embodiments, quantum computing service 102 includes quantum hardware provider recommendation/selection module 120. In some embodiments, quantum hardware recommendation/selection module 120 may make a recommendation to a quantum computing service customer as to which type of quantum computer or which quantum hardware provider to use to execute a quantum object submitted by the customer. Additionally, or alternatively, the quantum hardware provider recommendation/selection module 120 may receive a customer selection of a quantum computer type and/or quantum hardware provider to use to execute the customer's quantum object, such as a quantum task, quantum algorithm, quantum circuit, etc. submitted by the customer or otherwise defined with customer input.

In some embodiments, a recommendation provided by quantum hardware provider recommendation/selection module 120 may be based on one or more characteristics of a quantum object submitted by a customer and one or more characteristics of the quantum hardware providers supported by the quantum computing service 102, such as one or more of quantum hardware providers 122, 124, 126, or 128.

In some embodiments, quantum hardware provider recommendation/selection module may make a recommendation based on known data about previously executed quantum objects similar to the quantum object submitted by the customer. For example, quantum computing service 102 may store certain amounts of metadata about executed quantum objects and use such metadata to make recommendations. In some embodiments, a recommendation may include an estimated cost to perform the quantum computing task by each of the first and second quantum hardware providers. In some embodiments, a recommendation may include an estimated error rate for each of the first and second quantum hardware providers in regard to performing the quantum computing task. In some embodiments, a recommendation may include an estimated length of time to execute the quantum computing task for each of the first and second quantum hardware providers. In some embodiments, a recommendation may include various other types of information relating to one or more quantum hardware providers or any combination of the above.

In some embodiments, quantum compute simulator using classical hardware 118, may allow a customer to simulate one or more particular quantum computing technology environments. For example, a customer may simulate a quantum circuit in an annealing quantum computing environment and an ion trap quantum computing environment to determine simulated error rates. The customer may then use this information to make a selection of a quantum hardware provider to use to execute the customer's quantum circuit.

Figure 2A:
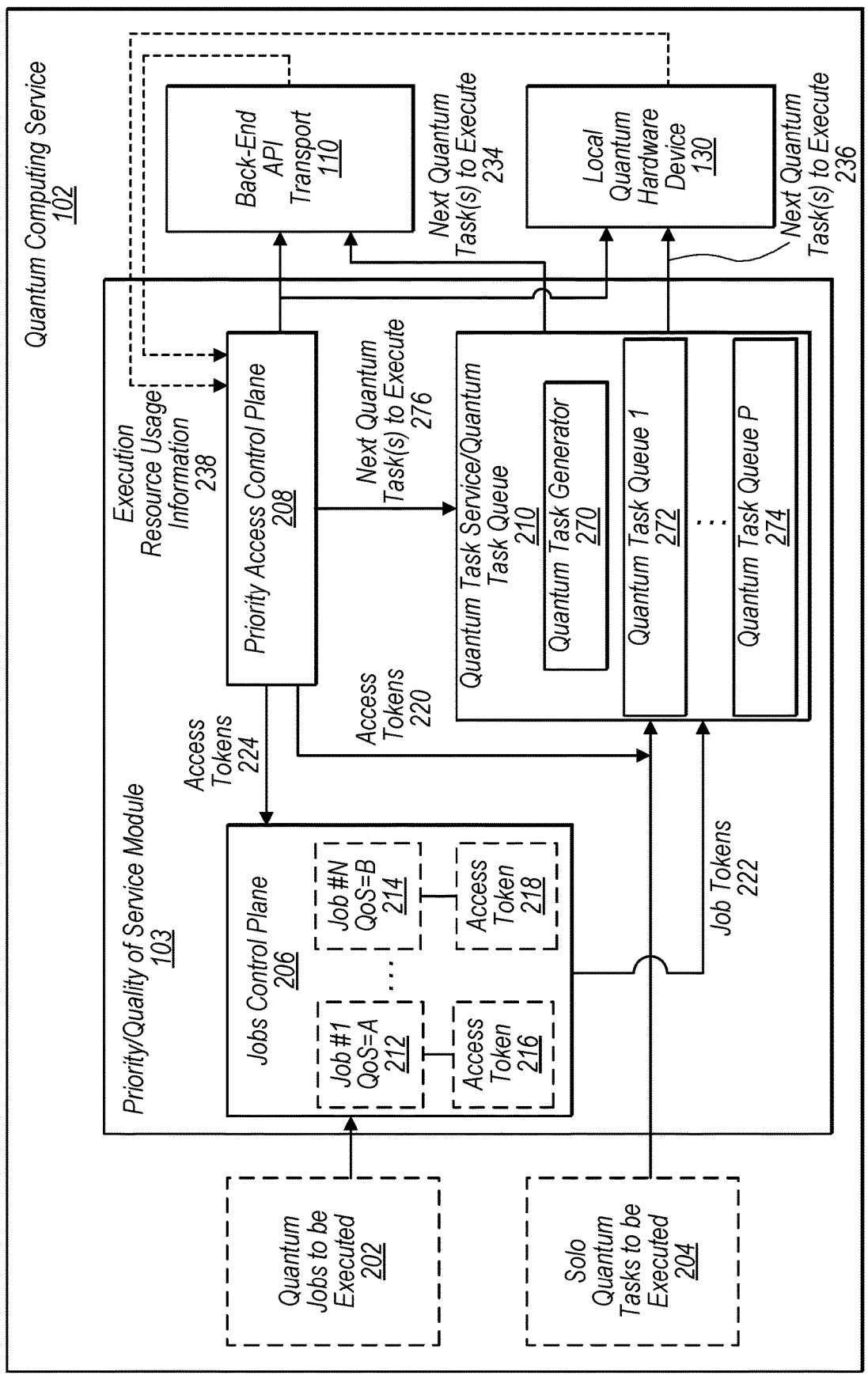
FIG. 2A illustrates a more detailed view of an example quality of service (QOS) and out-of-band prioritization module, according to some embodiments.

FIG. 2A illustrates a more detailed view of an example quality of service (Qos) and out-of-band prioritization module, according to some embodiments.

Quality of service (QOS) and out-of-band prioritization module 103 receives quantum jobs to be executed 202 and solo quantum tasks to be executed 204. For example, the quantum jobs and quantum tasks may be submitted to the quantum computing service 102 for execution by customers of the quantum computing service. Quality of service (QoS) and out-of-band prioritization module 103 includes a jobs control plane 206, a priority access control plane 208, and a quantum task service/quantum task queue 210. In some embodiments, jobs control plane 206 may attach access tokens 224 receive from priority access control plane 208 to jobs, wherein priorities associated with the access tokens are determined by the priority access control plane 208 based on the priority of the job, such as a QoS guarantee for the job relative to QoS guarantees for other jobs. For example, job 1 (212) has a QoS guarantee A and job N (214) has a QoS guarantee B. Based on these QoS guarantees, priority access control plane 208 may generate access tokens 224 for jobs 212 and 214 and jobs access control plane 206 may attach the respective access tokens, such as access tokens 216 and 218 to the quantum jobs 212 and 214. In some embodiments, jobs control plane 206 may further determine when to commence execution of a next quantum job based on the relative priority of the quantum job relative to other quantum jobs in a jobs control plane 206 queue, as determined by the priorities of the access tokens attached to the jobs. For example, if currently executing quantum jobs have QoS guarantees equal to the full capacity of a given QPU that is to execute a next quantum job, the jobs control plane 206 may refrain from commencing execution of the next quantum job until there is available capacity to execute the next quantum job. In some embodiments, instead of utilizing a FIFO model, jobs control plane 206 may choose a next quantum job to execute based on the priority of the access token attached to the job which is further based on a QoS guarantee, such that in some situations a later submitted quantum job may have execution commenced before an earlier submitted quantum job with a lesser QoS guarantee.

When a job is selected to be commenced by jobs control plane 206, a job token 222 comprising instructions for the job and an associated access token (e.g., 216 or 218) is submitted to quantum task service/quantum task queue 210. In some embodiments, quantum task service/quantum task queue 210 may generate quantum tasks for the quantum job and add the quantum tasks to one or more quantum task queues, such as quantum task queue 1 (272) or quantum task queue P (274). In some embodiments, quantum tasks in a given queue may have a same type access token, such as an access token corresponding to QoS A or QoS B. Priority access control plane 208 may determine from which one of queues 272 through 274 a next quantum task to be executed is to be pulled from, for example based on whether or not the QoS that has been provided for the given queue is above or below a QoS target for the given queue.

Furthermore, quantum task service/quantum task queue 210 may receive solo quantum tasks 204 and may attach access tokens 220 to the solo quantum tasks. In some embodiments, a solo quantum task may be assigned a default access token that indicates the task is a solo quantum task and that further indicates a timestamp when the access token was assigned to the solo quantum task. In contrast, the access tokens 216 and 218 assigned to the job-type quantum tasks may include an ID indicating the job to which the quantum task belongs and a time stamp for when the quantum task was added to the queue. Alternatively access tokens 216 and 218 may include a code or cryptographic message that tie the access tokens 216 and 218 to jobs 212 and 214, without actually including the job ID in the access token. Additionally, quantum task service/quantum task queue 210 orders the quantum tasks waiting for execution based on the priorities of the quantum tasks as determined based on the access tokens attached to the quantum tasks. For example, quantum tasks with an access token indicating a higher priority (or higher QoS level) may be added to quantum task queue 1 (272) and quantum tasks with a lower priority (or lower QoS level) may be added to one of a one or more intermediate or lower level priority tasks queues.

For example, a lower priority access token task may be added to quantum task queue P (274).

In some embodiments, the priority access control plane 208 may determine which of the queues a next quantum task should be pulled from when capacity becomes available to execute the next quantum task (or batch of quantum tasks). For example, priority access control plane 208 may determine next quantum task to execute 276. In some embodiments, next quantum task to execute 276 may be provided to quantum task service/quantum task queue 210 in order to select which of queues 272 through 274 a next quantum task is to be pulled from. In some embodiments, back-end API transport 110 and/or local quantum hardware device 130 may then receive the next quantum task in the indicated queue. In some embodiments, the fetching of the next quantum task may be performed directly between the back-end API transport 110 and/or local quantum hardware device 130 and quantum task service/quantum task queue 210. However, in other embodiments, a request for a next quantum task may be routed through priority access control plane 208, and the priority access control plane 208 may fetch the next quantum task from the appropriate one of queues 272 through 274 based on current prioritizations determined in view of QoS guarantees.

In some embodiments, priority access control plane 208 may receive execution resource usage information 238 and update prioritizations based on the updated information. For example, if quantum task queue 1 (272) corresponds to an 80% QoS level and quantum task queue P (274) corresponds to a 20% QoS level and the execution resource usage information 238 indicates that a current allocation distribution between tasks from queue 1 and queue P are 85% and 15%, respectively, then priority access control plane 208 may signal that a next quantum task (or batch of quantum tasks) to be pulled for execution are to be pulled from queue P, in order to get the QoS allocations to better match the QoS targets.

As explained above, Quality of service (QOS) and out-of-band prioritization module 103 may submit a next quantum task in the quantum task queue 210 immediately upon capacity being made available at a back-end API transport 110 to accept another quantum task without waiting for an updated prioritization to be determined for the quantum tasks in the one or more quantum task queues. For example, next quantum tasks to execute may be submitted to back-end API transport 110 or local quantum hardware device 130 from a head of a selected one of quantum tasks queues 272 through 274 when capacity to accept the quantum tasks becomes available.

When quantum tasks are executed, for example at a QHP via back-end API transport 110, or at a local quantum hardware device 110, execution resource usage information 238 may be provided back to the priority access control plane 208. This resource usage information may be used by priority access control plane 208 to determine updated priorities for jobs in order to enforce QoS guarantees. For example, increasing priorities for quantum tasks of quantum jobs that are falling short of a QoS target and reducing priorities for quantum tasks of quantum jobs that are exceeding their QoS targets. The updated priorities 276 may be provided to the quantum task service/quantum task queue 210. In some embodiments, the updated priorities may be communicated as updated priorities for classes of access tokens, such as access tokens comprising a job ID for job 1 or a job ID for job N. Additionally, or alternatively, the updated priorities may indicate that access tokens indicating solo tasks are to be prioritized differently. The updated priorities may be calculated whenever the execution resource usage information 238 is received. However, the next quantum tasks to execute may be pulled from a head of a given prioritized quantum task queue without waiting for updated priorities and/or without waiting for the quantum tasks to be re-ordered based on updated priorities. For example, if updated priority information is in the process of being calculated when capacity opens up to accept a next quantum task, whichever quantum task (or batch of quantum tasks if accepting a batch) that are at a head of a given prioritized queue may be pulled from the head of the queue based on a current order of the queue and the updated prioritization of the queues may proceed such that a next time capacity is available to accept a quantum task (or batch of quantum tasks), the next round of quantum task submittal is performed using the updated ordering based on the updated priorities.

Figure 2B:
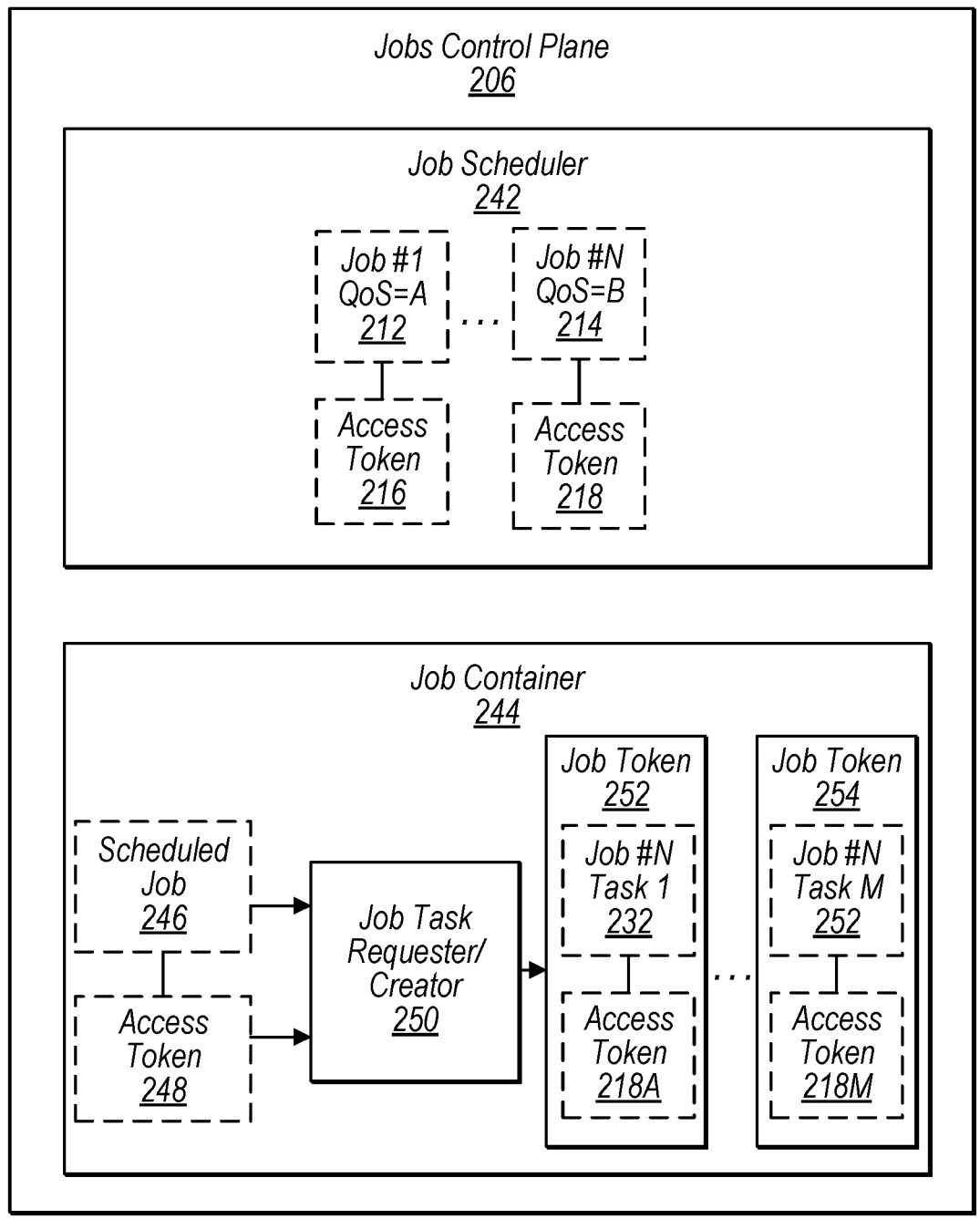
FIG. 2B illustrates a more detailed view of an example jobs control plane that may be included in a quality of service (QOS) and out-of-band prioritization module, according to some embodiments.

FIG. 2B illustrates a more detailed view of an example jobs control plane that may be included in a quality of service (QOS) and out-of-band prioritization module, according to some embodiments.

In some embodiments, jobs control plane 206 may include a job scheduler 242 that orders jobs in a queue that are waiting to be commenced. Also, the jobs control plane 206 may include a jobs container 244 that creates job tokens for scheduled jobs. For example, scheduled job 246 with associated access token 248 is submitted to job task requestor/creator 250 with may generate job tokens, such as job tokens 252 and 254. The job tokens may include a task for the job and an associated access token attached to the quantum task. For example, job token 252 includes task 1 (232) for job N with attached access token 218A and job token 254 includes task M (252) for job N with attached access token 218M. In some embodiments, job task requester/creator 250 may submit requests to quantum task service 210 to create a quantum task as defined by a jobs token, or may create the quantum task and include the quantum task in a jobs token.

Figure 2C:
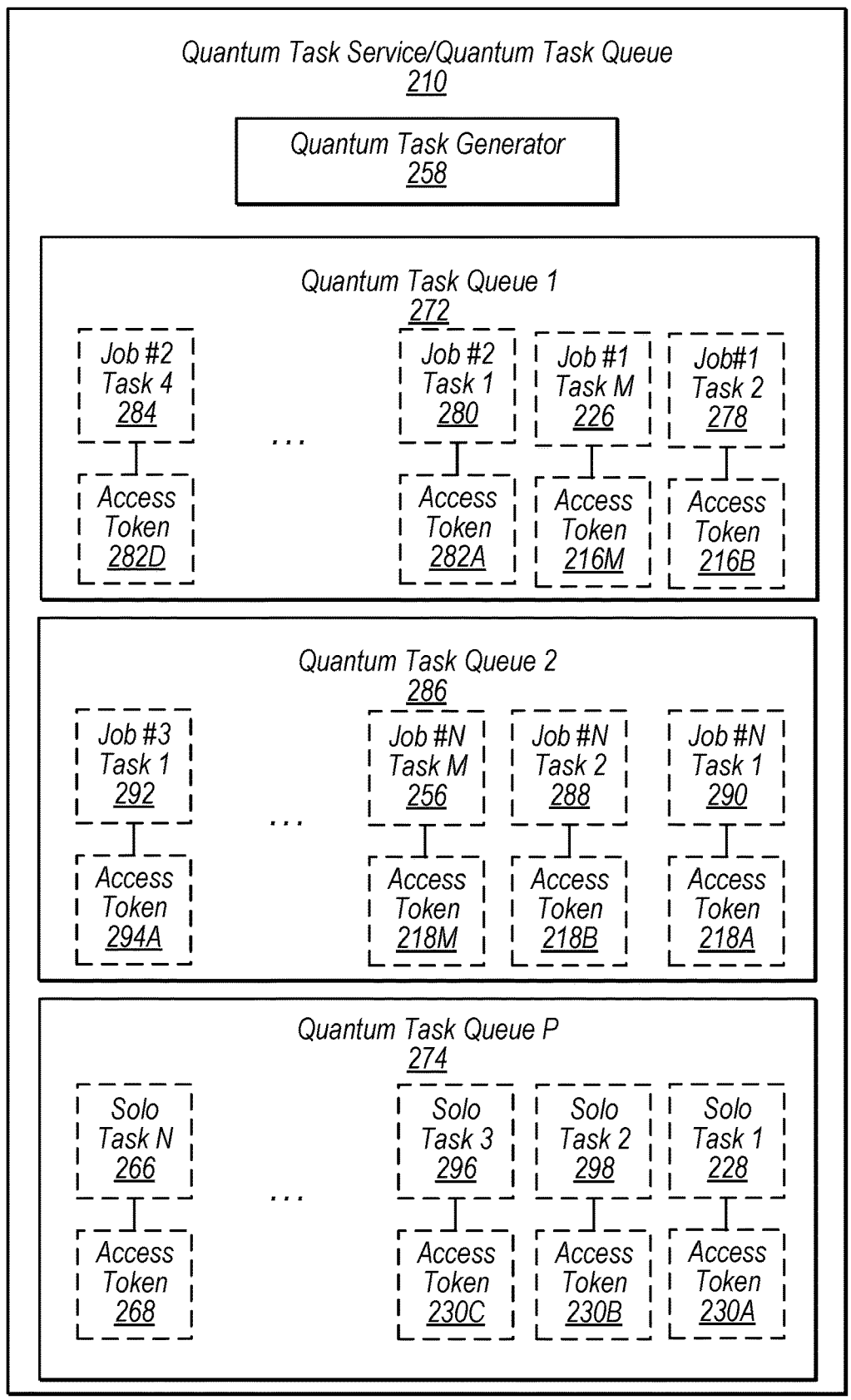
FIG. 2C illustrates a more detailed view of an example of a quantum task generation service and quantum task queue that may be included in a quality of service (QoS) and out-of-band prioritization module, according to some embodiments.

FIG. 2C illustrates a more detailed view of an example of a quantum task generation service and quantum task queue that may be included in a quality of service (QoS) and out-of-band prioritization module, according to some embodiments.

In some embodiments, quantum task service/quantum task queue 210 includes a quantum task generator 258 which may generate quantum tasks for a quantum job based on a received jobs token. Additionally, the quantum task service/ quantum tasks queue 210 includes a quantum task queues 272 and 274, along with one or more intermediate queues 286.

In some embodiments, different ones of the queues may correspond to different QoS guarantee levels. For example, quantum task queue 1 includes tasks for job 1, such as tasks 2 (278) and (M) 226. As shown in FIG. 2A, job 1 has a QoS guarantee A. In some situations, more than one job may share a same QoS guarantee level. For example, job 2 may also be assigned QoS guarantee level A. Thus tasks 280 and 284 of job 2 may also be included in quantum task queue 1 (272). In some embodiments, the tasks may be assigned to a given queue based on the access token associated with the given task. For example, access tokens 282 and 216 may correspond to a QoS guarantee A.

As another example, job N has QoS guarantee level B and tasks (290, 288, and 256) of job N are assigned to quantum task queue 2 (286) along with task 292 of job 3, which may also have a same QoS guarantee. This may be indicated via access tokens 218 and 294.

As yet another example, solo tasks 1-3 (228, 296, and 298) have associated access tokens 230 and are assigned to quantum task queue P (274), along with solo task 266 with access token 268. In some embodiments, a default QoS and associated access token type may be assigned to solo quantum tasks.

In some embodiments, as further shown in FIG. 4, an access token may include a time stamp, and access tokens having an equal priority (e.g., they result in associated quantum tasks ending up in the same quantum task queue) may be sorted in a given queue based on the time stamp values. For example, older quantum tasks in a given queue may be closer to the head of the queue and newer quantum tasks in the queue may be closer to an entry end of the queue.

Figure 3A:
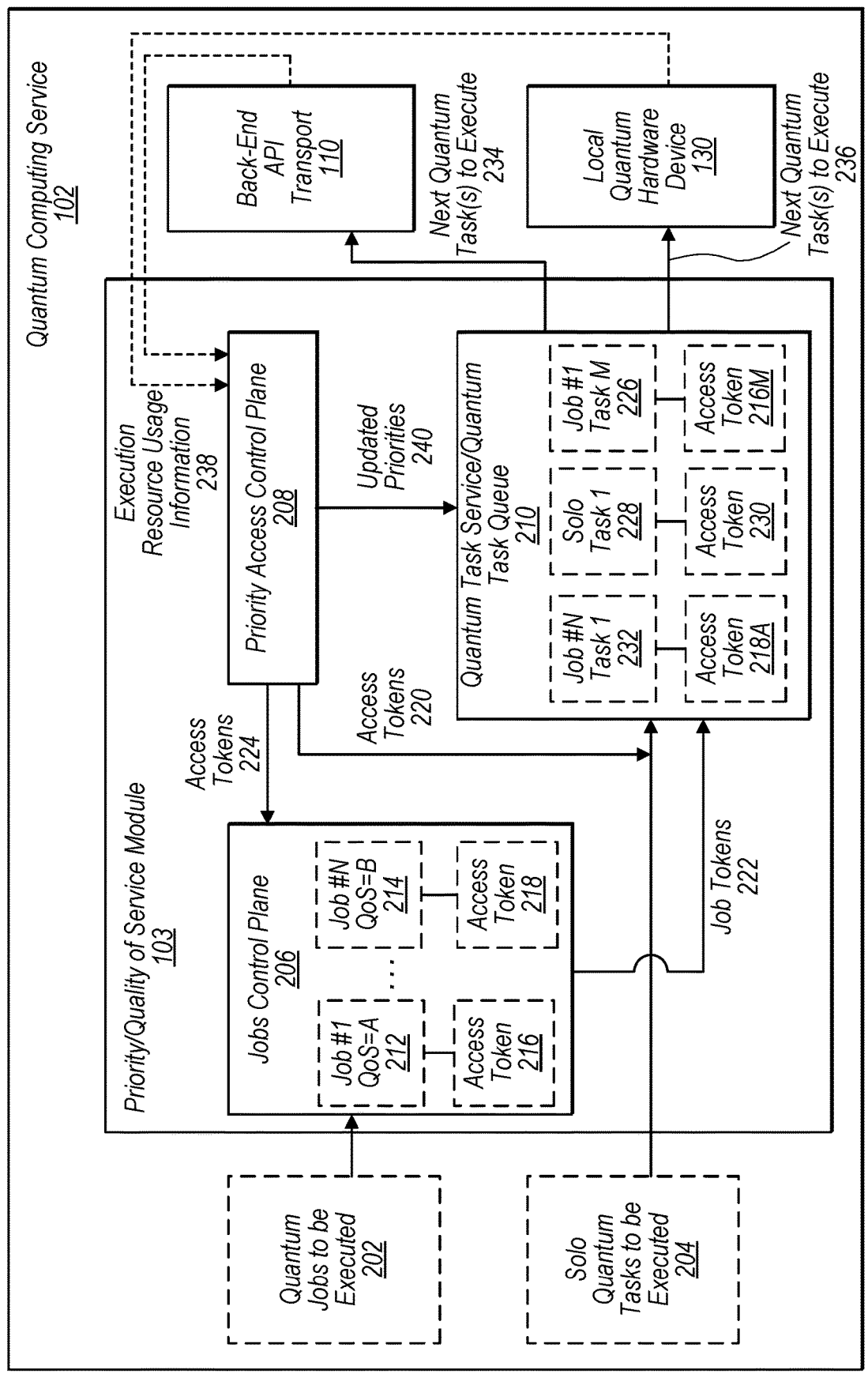
FIG. 3A illustrates a more detailed view of another example quality of service (QoS) and out-of-band prioritization module, according to some embodiments.

FIG. 3A illustrates a more detailed view of another example quality of service (QoS) and out-of-band prioritization module, according to some embodiments. In some embodiments, quantum task service/quantum task queue 210 may include a combined quantum task queue.

In some embodiments, quantum task service/quantum task queue 210 may include a combined queue for quantum tasks. For example, quantum task queue 210 includes job 1 task M (226) with associated access token 216 at the head of the queue. Additionally, quantum task queue 210 includes solo task 1 (228) with associated access token 230 in a next position in the queue. Also, quantum task queue 210 includes job N task 1 (232) with associated access token 218A in a subsequent position in the queue. In some embodiments, a priority access control plane may provide updated priorities 240 to quantum task service/quantum task queue 210 and an order of the quantum tasks in the queue may be re-ordered based on the updated priorities 240. In such embodiments, jobs control plane 206 may function in a similar manner as described in FIG. 2B.

Figure 3B:
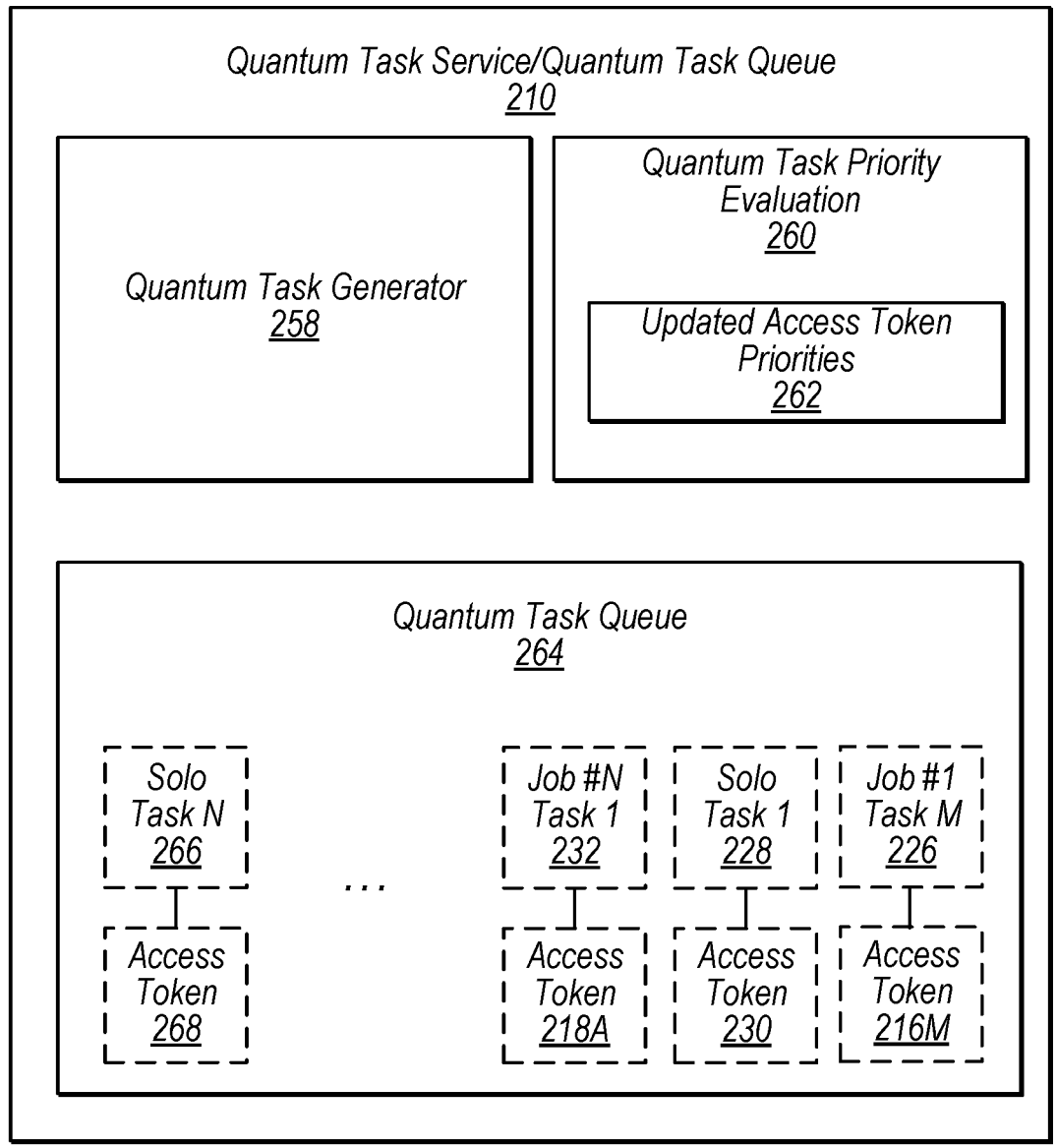
FIG. 3B illustrates a more detailed view of another example of a quantum task generation service and quantum task queue that may be included in a quality of service (QoS) and out-of-band prioritization module, according to some embodiments.

FIG. 3B illustrates a more detailed view of another example of a quantum task generation service and quantum task queue that may be included in a quality of service (QoS) and out-of-band prioritization module, according to some embodiments. In some embodiments, quantum task service quantum task queue 210 may include quantum task priority evaluation module 260 that stores updated access token priorities 262, such as may be received via updated priorities 240. These updated priorities may be used to update the order of tasks 226, 228, 232, and 266 based on priorities assigned to the access tokens associated with the tasks, such as access tokens 216, 218, 230, and 268.

Figure 4A:
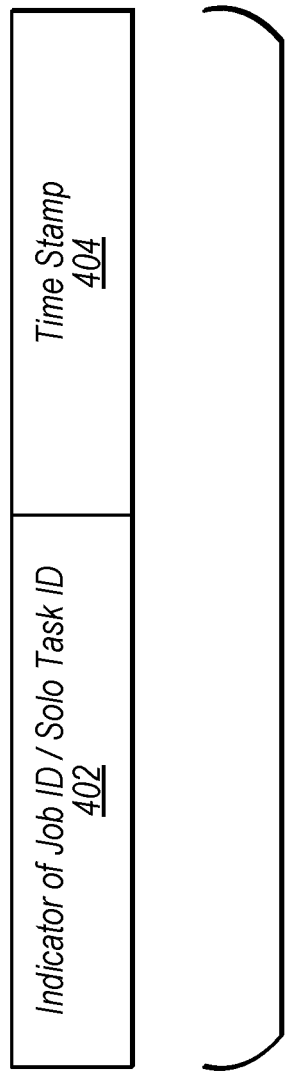
FIGS. 4A-4B illustrate example access tokens that may be used by a quality of service (QOS) and out-of-band prioritization module, according to some embodiments.

FIG. 4A illustrates an example access token that may be used by a quality of service (QOS) and out-of-band prioritization module, according to some embodiments.

In some embodiments, an access token may include multiple parts. For example, in some embodiments, a first set of bits of an access token may indicate whether the attached quantum task is a solo quantum task or a quantum task for a larger quantum job. For example, access token 408 illustrated in FIG. 4A includes an indicator of a Job ID (402) for a job with which the access token is associated. In some embodiments, an access token for a solo task may include a solo task ID or an ID of a customer that submitted the solo task. For example, access token 408 includes indicator of job ID or solo task ID section 402. Additionally, an access token, such as access token 408, may include a timestamp 404 indicating a time when the quantum task with the attached access token 408 was added to the quantum task queue 272, 286, 274, or 264, as a few examples.

Figure 4B:
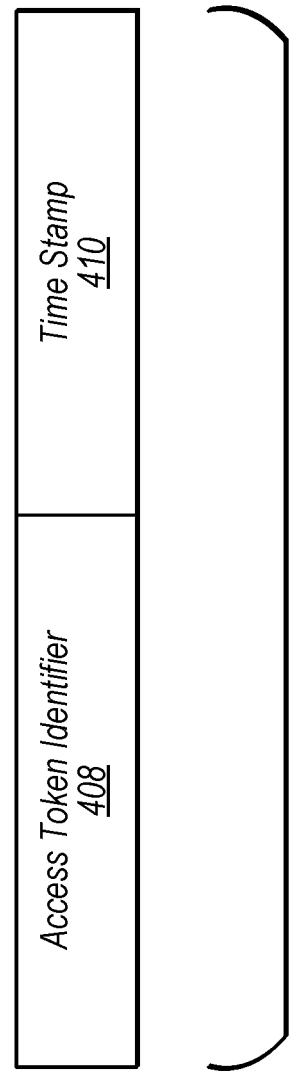

FIG. 4B illustrates another example access token that may be used by a quality of service (QOS) and out-of-band prioritization module, according to some embodiments.

In some embodiments, instead of including a job ID, an access token 412 may include an identifier, such as a code, encrypted bits, etc. that the access control plane associates with a job or solo task, such as access token identifier 408. Additionally, the access token 412 may include timestamp 410.

Figure 5:
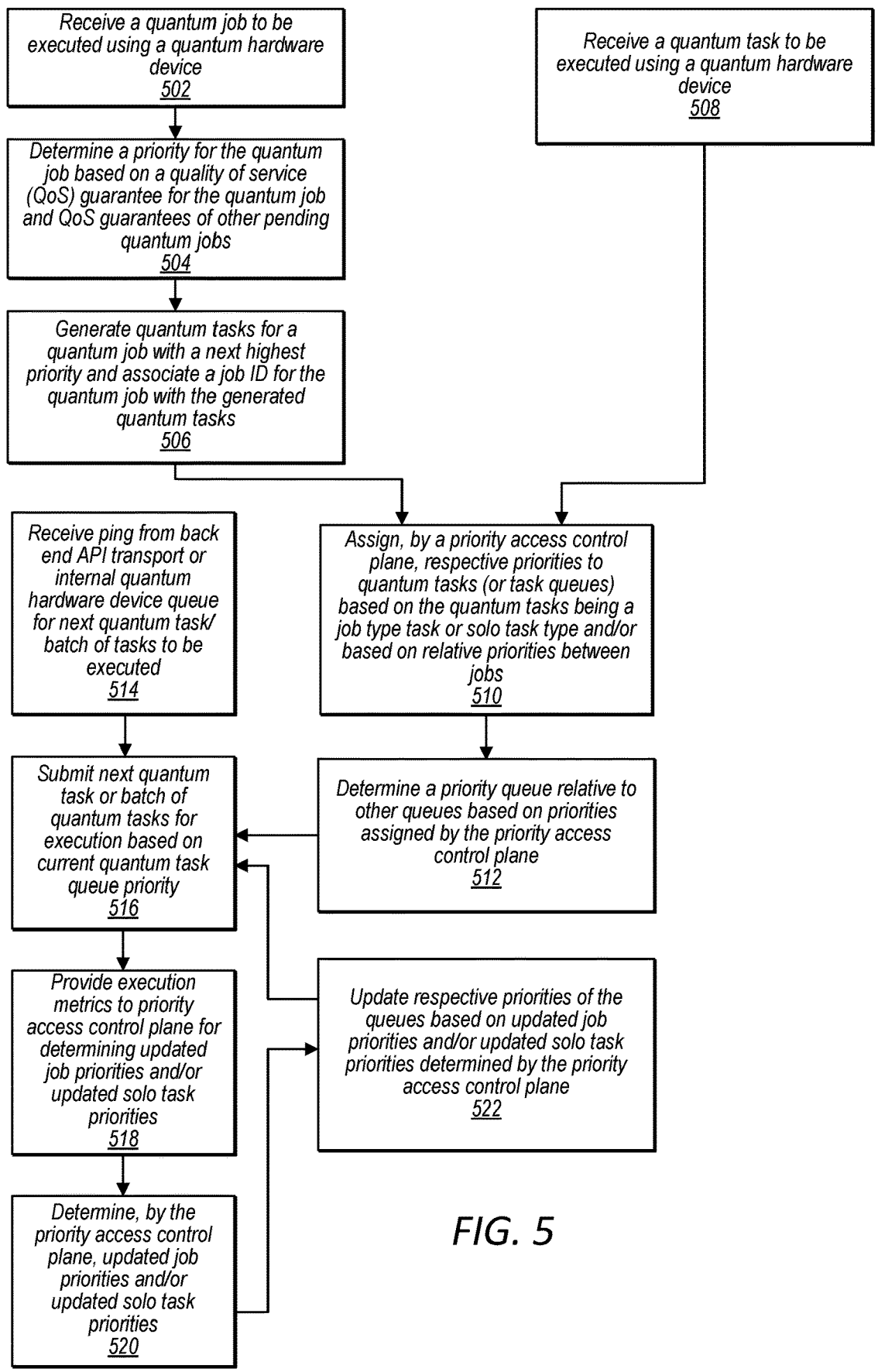
FIG. 5 illustrates an example process that may be followed by a quality of service (QOS) and out-of-band prioritization module to assign and update respective priorities for quantum tasks in a quantum task queue, according to some embodiments.

FIG. 5 illustrates an example process that may be followed by a quality of service (QOS) and out-of-band prioritization module to assign and update respective priorities for quantum tasks in a quantum task queue, according to some embodiments.

At block 502, a quantum computing service receives a quantum job to be executed using a quantum hardware device. At block 504, a priority access control plane of the quantum computing service determines a priority for the quantum job based on a quality of service (QOS) guarantee for the quantum job and QoS guarantees of other pending quantum jobs. Then at block 506, a jobs control plane and/or a quantum task service of the quantum computing service generates quantum tasks for a quantum job with a next highest priority and associates a job ID for the quantum job with the generated quantum tasks. Additionally, at block 508, the quantum computing service receives one or more solo quantum tasks to be executed using the quantum hardware device, wherein the solo quantum tasks are not part of a larger quantum job. For example, the solo quantum tasks may be individual quantum circuits that are to be executed using the quantum hardware device.

At block 510, the priority access control plane assigns respective priorities to quantum tasks based on the quantum tasks being a job type task or solo task type and/or based on relative priorities between jobs, such as may be determined based on quality of service (QOS) guarantees. This may be done by determining priorities for types of access tokens, such as access tokens indicating a solo quantum task or a job-type quantum task. Additionally, this may be done by determining priorities for access tokens comprising particular job IDs, or that are associated with particular job IDs having particular QoS guarantees. At block 512, a quantum task service determines a priority ordering of quantum tasks relative to other quantum tasks in a quantum task queue based on priorities assigned by the priority access control plane. Additionally, or alternatively, at block 512, the priority access control plane determines a priority of queues included in the quantum task service/quantum task queue. For example, a prioritization of the queues 1 through P as shown in FIG. 2C may be determined.

Outside of the path of the prioritization assignments performed at block 510 and the re-ordering of the quantum task queue (or re-prioritization of the queues) performed at block 512, at block 514, the quantum computing service receives a ping from a back-end API transport or internal quantum hardware device queue for a next quantum task/batch of tasks to be executed. In response, at block 516 (which is outside the path of the prioritization assignments performed at block 510 and the re-ordering of the quantum task queue (or re-prioritization of the queues) performed at block 512) the quantum computing service submits a next quantum task or batch of quantum tasks for execution based on a current quantum task queue priority.

At block 518 the quantum computing service receives execution metrics for the submitted quantum tasks and provides the execution metrics to the priority access control plane for determining updated job priorities and/or updated solo task priorities. At block 520, the priority access control plane determines the updated job priorities and/or updated solo task priorities based on the received execution metrics. Then, at block 522, the quantum task service updates the priorities (and orders) of the quantum tasks in the quantum task queue relative to other quantum tasks in the quantum task queue based on updated job priorities and/or updated solo task priorities determined by the priority access control plane (or determines a re-prioritization of the queues). Then, when a next quantum task or batch of quantum tasks is submitted for execution at block 516, the next quantum task to be submitted is selected using the updated priorities and ordering of the quantum task queue.

Figure 6:
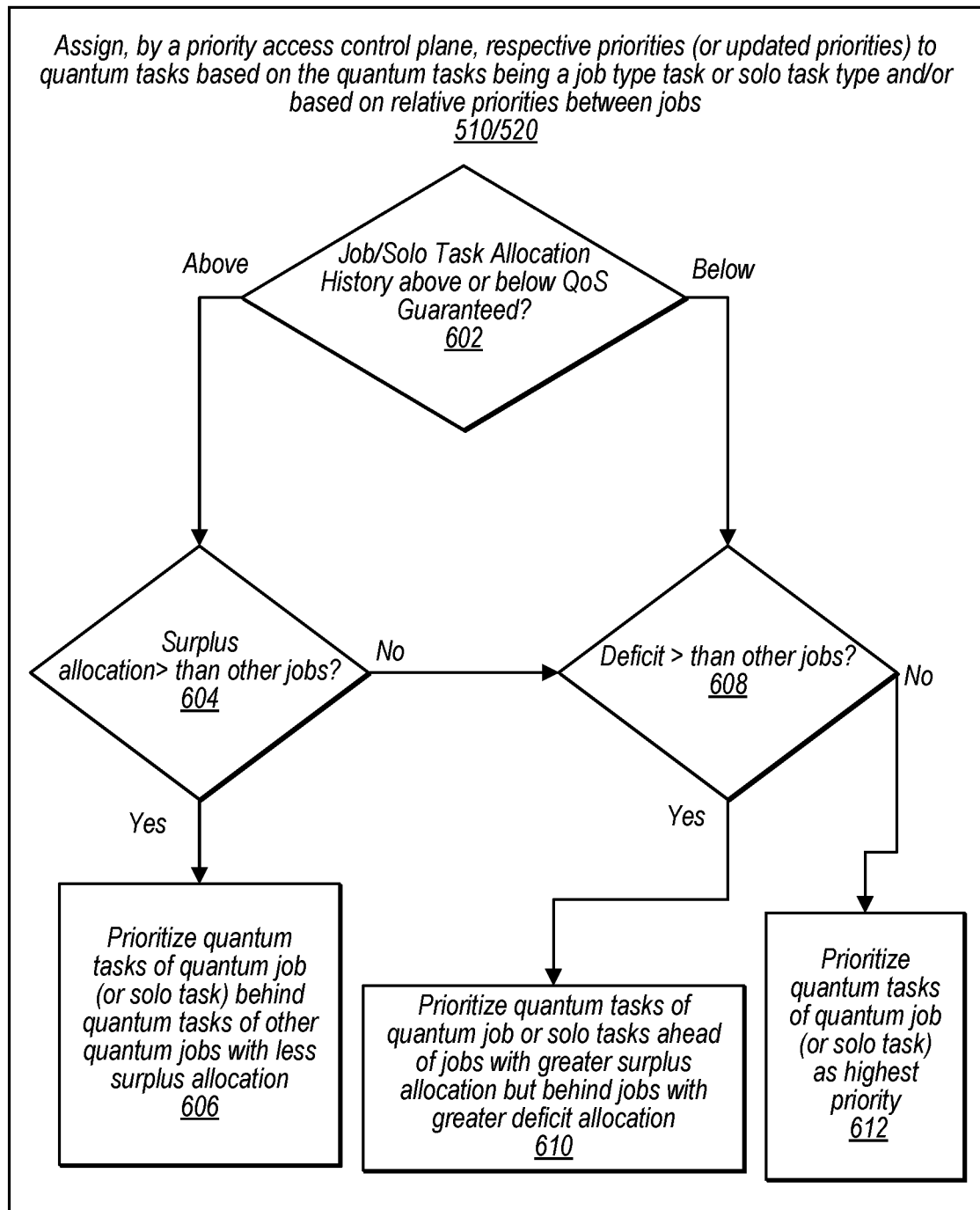
FIG. 6 illustrates a more detailed view regarding how priorities of quantum job tasks and solo quantum tasks may be managed by a quality of service (QOS) and out-of-band prioritization module, according to some embodiments.

FIG. 6 illustrates a more detailed view regarding how priorities of quantum job tasks and solo quantum tasks may be managed by a quality of service (QOS) and out-of-band prioritization module, according to some embodiments.

In some embodiments, in order to assign or update priorities for access tokens (and therefore quantum tasks) a priority access control plane may follow a process as shown in FIG. 6. For example, at block 602, the priority access control plane determines for one or more jobs or solo tasks whether a QoS guarantee associated with the job or solo tasks is currently being exceeded or not. For example, if a current history of allocation of resources for the job or solo tasks is above the QoS target for the job or solo tasks, then the QoS allocation is in a surplus status. In that case, at block 604, the priority access control plane determines whether or not the surplus is greater than respective surpluses for one or more other access token types or queues that also have a current allocation history in a surplus status. If the surplus is greater than a surplus for other jobs or queues, then at block 606 the job or queue associated with the job and/or access token type for which a QoS is being calculated is prioritized such that it is behind other jobs/solo tasks/access token types/queues, etc. that have less of a surplus or a deficit.

Back at block 602, if it is alternatively determined that the job/solo task/queue being evaluated has a current allocation history that is less than its associated QoS target, then at block 608 it is determined whether or not its deficit allocation is less then respective deficit allocations for other jobs/solo tasks/queues, etc. in a deficit status. If the job/solo task/queue has the greatest deficit (e.g., largest deviation from the QoS target) then it is assigned a highest priority at block 612. If not, at block 610 it is assigned a lower priority relative to the other jobs/solo tasks/queues with greater deficits, but a higher priority relative to other jobs/solo tasks/queues with a lesser deficit or surplus.

Figure 7:
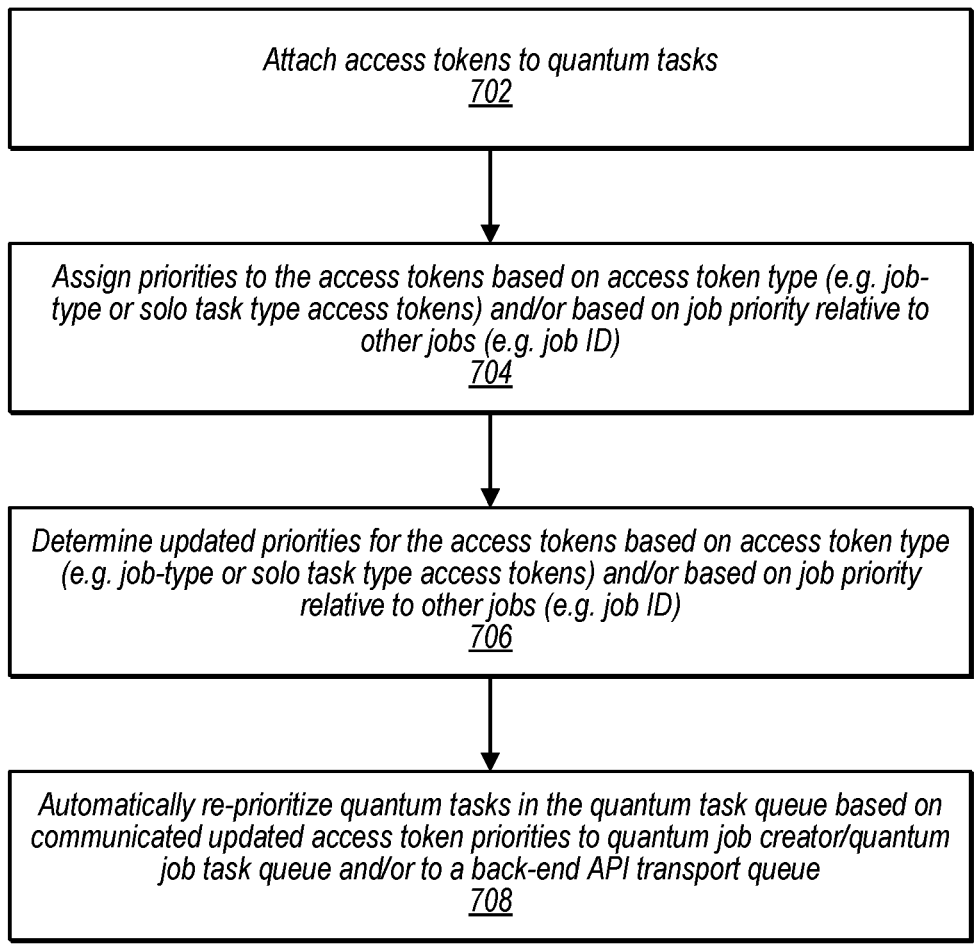
FIG. 7 illustrates an example process by which a quality of service (QOS) and out-of-band prioritization module uses access tokens to manage respective priorities of quantum tasks in a quantum task queue, according to some embodiments.

FIG. 7 illustrates an example process by which a quality of service (QOS) and out-of-band prioritization module uses access tokens to manage respective priorities of quantum tasks in a quantum task queue, according to some embodiments.

At block 702, the quantum computing service attaches access tokens to quantum tasks stored in, or to be stored in, a quantum task queue. At block 704, the priority access control plane assigns priorities to the access tokens based on an access token type (e.g., job-type or solo task type access tokens) and/or based on job priorities of jobs associated with the respective access tokens relative to other jobs (e.g., based on job ID). At block 706, the priority access control plane determines updated access token priorities, for example in response to receiving execution resource usage information 238. The updated priorities are further determined based on an access token type (e.g., job-type or solo task type access tokens) and/or based on job priorities of jobs associated with the respective access tokens relative to other jobs (e.g., based on job ID). At 708, the quantum task que is automatically re-prioritized based on the updated access token priorities.

FIG. 8 illustrates edge computing devices of a quantum computing service physically located at quantum hardware provider locations, according to some embodiments.

In some embodiments, service provider network 100, as illustrated in FIG. 1, may include one or more data centers connected to each other via private or public network connections. Also, edge computing devices located at quantum hardware provider locations may be connected to a service provider network via private or public network connections. For example, service provider network 100 illustrated in FIG. 8 includes data centers 806a, 806b, and 806c that are connected to one another via private physical network links of the service provider network 100. In some embodiments, a customer of the service provider network may also be connected via a private physical network link that is not available to the public to carry network traffic, such as a physical connection at a router co-location facility. For example, customer 810 is connected to a router associated with data center 806c via direct connection 824. In a similar manner, edge computing devices located at quantum hardware provider locations may be connected to a service provider network via a private physical network link that is not available to carry public network traffic.

For example, edge computing device 804a located at quantum hardware provider location 802a is connected to a router at data center 806a via direct connection 818. In a similar manner, edge computing device 804b at quantum hardware provider location 802b is connected to a router at data center 806b via direct connection 820. Also, edge computing device 804c at quantum hardware provider 802c is connected to a router at data center 806c via direct connection 822.

Also, in some embodiments an edge computing device of a service provider network located at a quantum hardware provider location may be connected to the service provider network via a logically isolated network connection over a shared network connection, such as via the Internet or another public network. For example, edge computing device 804d at quantum hardware provider location 802d is connected to data center 806c via a logically isolated network connection via network 816. In a similar manner, in some embodiments a customer, such as customer 814, may be connected to service provider network 100 via public network 812.

In some embodiments, a quantum computing service such as quantum computing service 102, may be implemented using one or more computing devices in any of data centers 806a, 806b, 806c, etc. Also, the quantum computing service 102, may provide customers, such as customer 814 or customer 810, access to quantum computers in any of quantum hardware provider locations 802a, 802b, 802c, 802d, etc. For example, a customer may not be restricted to using a quantum hardware provider in a local region where the customer is located. Instead, the customer may be allocated compute instances instantiated on a local edge computing device located at a selected quantum hardware provider location, such that the location of the customer does not restrict the customer's access to various types of quantum computing technology-based quantum computers.

In some embodiments, one or more of the data centers 806 may also include local quantum hardware devices, such as local QPUs 826.

Example Edge Computing Device Located at a Quantum Hardware Provider Location

Figure 9:
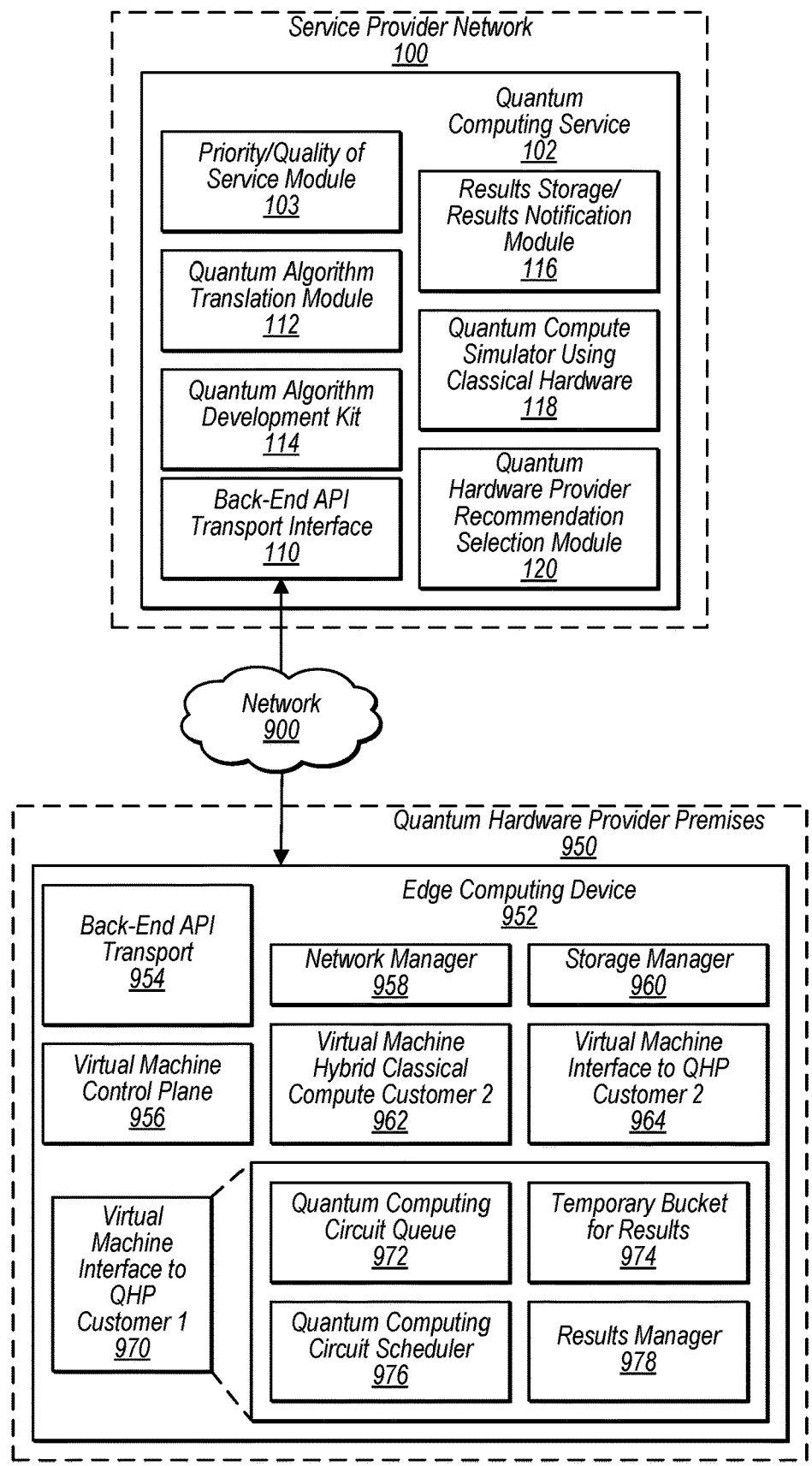
FIG. 9 illustrates an example edge computing device connected to a quantum computing service, according to some embodiments.

FIG. 9 illustrates an example edge computing device connected to a quantum computing service, according to some embodiments.

Service provider network 100 and quantum computing service 102 may be similar to the service provider networks and quantum computing services described herein, such as in FIG. 1. Also, edge computing device 952 may be a similar edge computing device as any of the edge computing devices described previously, such as in FIG. 1 or 8. Edge computing device 952 is connected to service provider network 100 via network connection 900, which may be a logically isolated network connection via a public network, a dedicated physical non-public network link, or other suitable network connection.

Edge computing device 952 includes network manager 958, storage manager 960, and virtual machine control plane 956.

In some embodiments, a back-end application programmatic interface (API) transport of an edge computing device, such as back-end API transport 954 of edge computing device 952 may ping a quantum computing service to determine if there are quantum circuits (e.g., quantum tasks) waiting to be transported to the edge computing device. The edge computing device may further use a non-public back-end API transport, such as back-end API transport 954 to bring the quantum circuit into the edge computing device 952.

Additionally, for each customer, a back-end API transport of an edge computing device of a quantum computing service, such as back-end API transport 954 of edge computing device 952, may cause a virtual machine to be instantiated to manage scheduling and results for a given quantum circuit pulled into the edge computing device from a back-end API. For example, virtual machine 970 may act as an interface to the quantum hardware provider for a given customer of the quantum computing service. The edge computing device may be directly connected to a local non-public network at the quantum hardware provider location and may interface with a scheduling component of the quantum hardware provider to schedule availability (e.g., usage slots) on a quantum computer of the quantum hardware provider.

In some embodiments, the virtual machine 970 may be booted with a particular quantum machine image that supports interfacing with the scheduling component of the quantum hardware provider, wherein different quantum hardware providers require different scheduling interfaces.

In some embodiments, virtual machine 970 may be booted with a quantum circuit queuing component 972, a quantum circuit scheduling component 976, a component that manages a local storage bucket on the edge computing device to temporarily store results, such as temporary bucket 974 and results manager 978. In some embodiments, quantum circuit scheduling component 976 may order quantum circuits in quantum circuit queuing component in the order they are received, wherein the received order enforces QoS guarantees by ordering the quantum tasks in the quantum task queue of the quantum computing service based on priorities determined using the QoS guarantees.

In some embodiments, an edge computing device, such as edge computing device 952, may support multi-tenancy. Also, in some embodiments, edge computing device 952 may also instantiate virtual machines that execute classical computing tasks, such as a classical computing portion of a hybrid algorithm. For example, edge computing device 952 also includes a virtual machine 962 for another customer that performs classical compute portions of a hybrid algorithm and an additional virtual machine 964 for the other customer which acts as a quantum hardware provider interface for the other customer.

In some embodiments, a back-end API transport of an edge computing device located a quantum hardware provider location may interface with a back-end API transport interface 110 of a computing device/router at a remote location where one or more computing devices that implement the quantum computing service are located.

Note that edge computing device 952 may be physically located at quantum hardware provider premises 950, such as in a building of a quantum hardware provider facility.

In some embodiments, the components of virtual machine 970 may be included in back-end API transport 954, and the back-end API transport 954 may execute the related components within the back-end API transport without causing a separate VM 970 to be instantiated.

Figure 10:
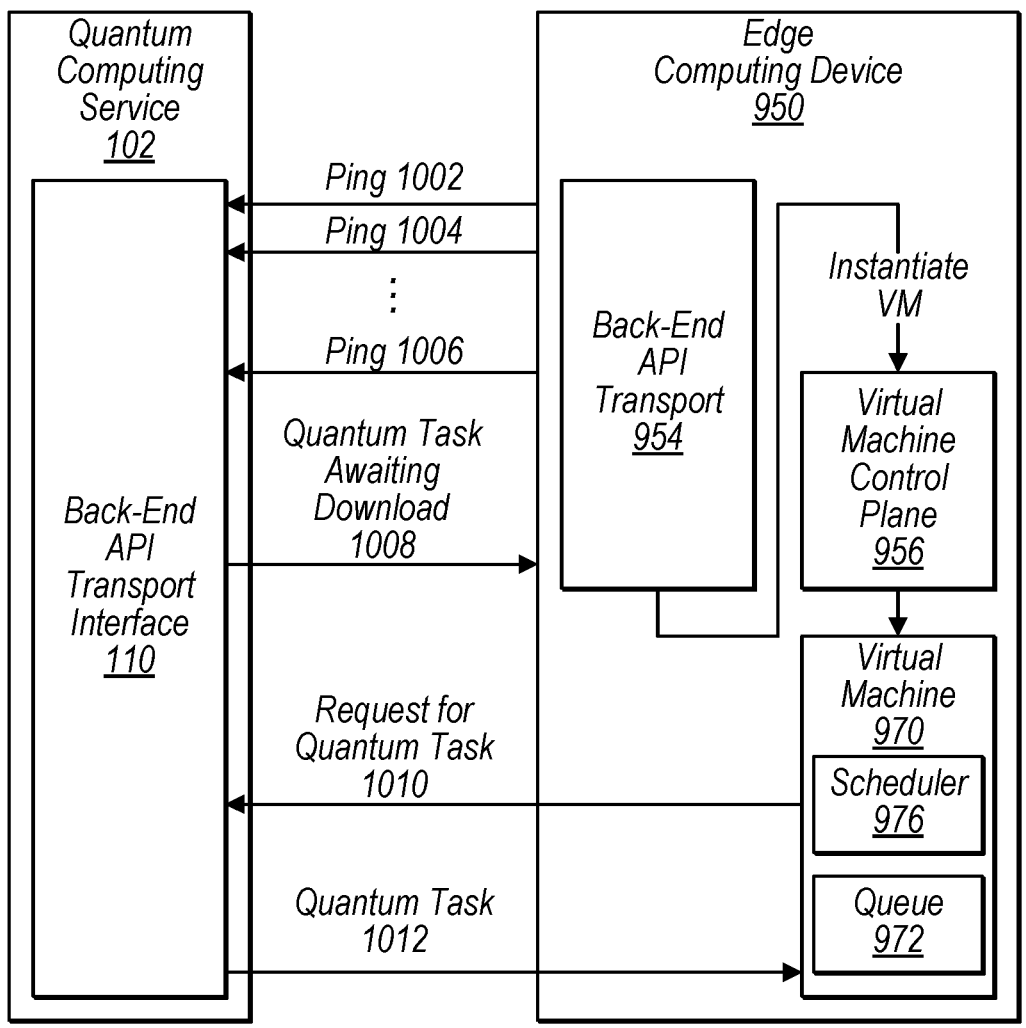
FIG. 10 illustrates example interactions between a quantum computing service and an edge computing device of the quantum computing service, according to some embodiments.

FIG. 10 illustrates example interactions between a quantum computing service and an edge computing device of the quantum computing service, according to some embodiments.

A back-end API transport 954 of edge computing device 952 may submit pings 1002, 1004, 1006, etc. to quantum computing service 102 to determine whether there is a quantum computing circuit (e.g., quantum task) to be transported to edge computing device 952. At 1008, the quantum computing service 102 may indicate to the edge computing device 952 that there is a translated quantum circuit (e.g., quantum task) ready to be transported to the edge computing device 952. In response, back-end API transport 954, may cause virtual machine control plane 956 to instantiate a virtual machine 970 to act as an interface for the customer to the quantum hardware provider. At 910 the VM 970 may call the back-end API transport 954 requesting the translated quantum circuit (e.g., quantum task or batch of quantum tasks). In response, at 1012, the back-end API transport 954 may cause the translated quantum circuit (e.g., quantum task or batch of quantum tasks) to be transported to the queue 972 of VM 970. In some embodiments, instead of pings of a polling protocol, an edge computing device 952 may use various other techniques to determine whether there is a quantum computing circuit (e.g., quantum task or batch of quantum tasks) ready to be transported to edge computing device 952. Also, in some embodiments, a given quantum hardware provider may include more than one quantum computer and/or types of quantum computers. In such embodiments, a back-end API transport and/or VM interface to the QHP may route a quantum circuit that is to be executed at the quantum hardware provider to an assigned quantum computer at the quantum hardware provider.

In some embodiments, quantum tasks may come over to queue 972 with associated access tokens and the quantum tasks may be ordered in queue 972 based on their respective access tokens, or time stamps included in the respective access tokens.

Figure 11A:
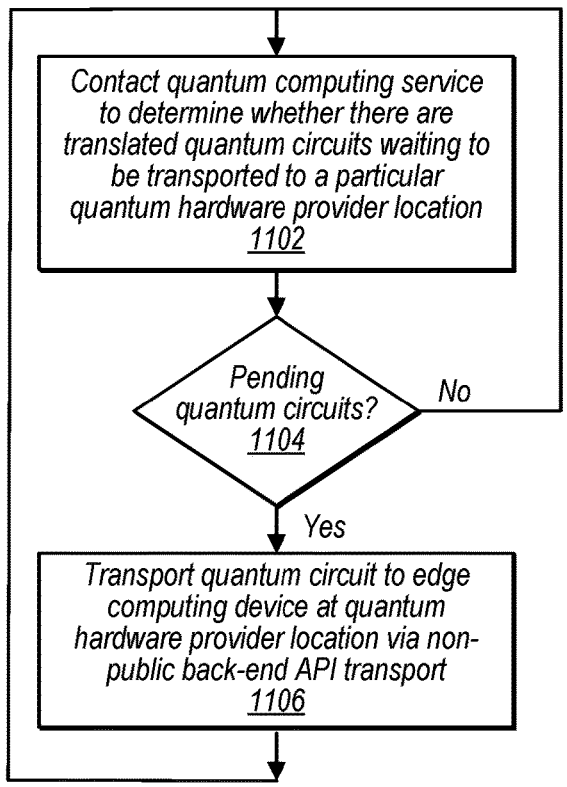
FIG. 11A, illustrates an example process for transporting quantum circuits from a quantum computing service to an edge computing device of the quantum computing service, according to some embodiments.

FIG. 11A, illustrates an example process for transporting quantum circuits from a quantum computing service to an edge computing device of the quantum computing service, according to some embodiments.

At 1102, an edge computing device contacts (e.g., pings) a quantum computing service to determine whether there are translated quantum circuits (e.g., quantum tasks) waiting to be transported to a particular quantum hardware provider location.

If it is determined at 1104, that there is a pending quantum circuit, at 1106, the edge computing device uses a back-end API of the quantum computing service to transport the quantum circuit to the edge computing device at the quantum hardware provider location.

Figure 11B:
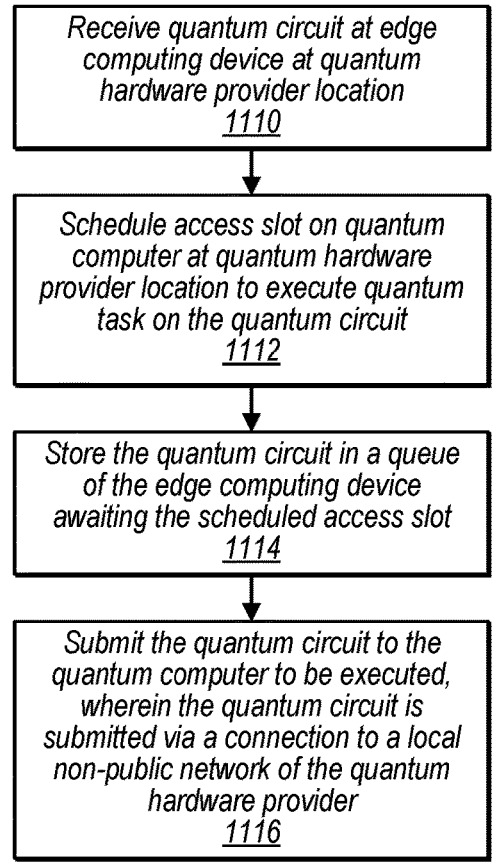
FIG. 11B, illustrates an example process for scheduling execution of a quantum circuit on a quantum computer by an edge computing device of a quantum computing service that is located at a quantum hardware provider location, according to some embodiments.

FIG. 11B, illustrates an example process for scheduling execution of a quantum circuit on a quantum computer by an edge computing device of a quantum computing service that is located at a quantum hardware provider location, according to some embodiments.

At 1110, the edge computing device receives the quantum circuit at the back-end API transport. At 1112, a scheduler 976 of a quantum hardware provider interface VM 970 instantiated on the edge computing device coordinates scheduling a time slot on a quantum computer at the quantum hardware provider location to execute quantum tasks using the quantum circuit. Also, concurrently the VM 970 causes the quantum circuit to be stored in a queue 972 awaiting the time slot.

At 1116, the VM 970 causes the quantum circuit to be submitted to the quantum computer to be executed, wherein the quantum circuit is submitted via a connection to a local non-public network of the quantum hardware provider.

Figure 11C:
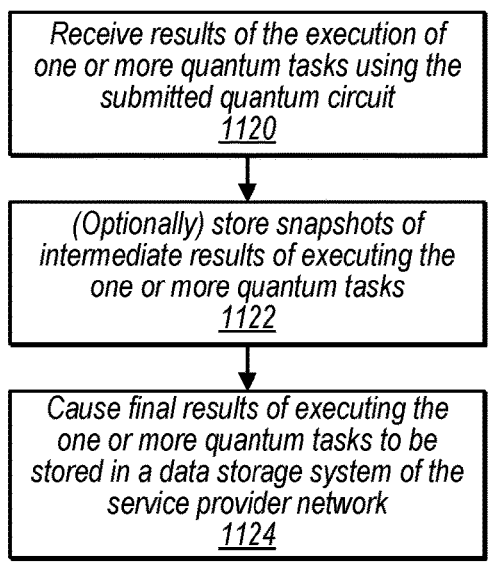
FIG. 11C, illustrates an example process for processing results of an execution of a quantum circuit on a quantum computer by an edge computing device of a quantum computing service that is located at a quantum hardware provider location, according to some embodiments.

FIG. 11C, illustrates an example process for processing results of an execution of a quantum circuit on a quantum computer by an edge computing device of a quantum computing service that is located at a quantum hardware provider location, according to some embodiments.

At 1120, a temporary bucket 974 implemented by the VM 970 receives results of the execution of one or more quantum jobs using the submitted quantum circuit.

At 1122, the results manager 978 optionally causes snapshots of the results to be stored to a data storage service.

At 1124, the results manager 978 causes final results of executing the one or more quantum jobs to be stored in a data storage system of the service provider network.

Example Configurations for Executing a Hybrid Algorithm

In some embodiments, a virtualized computing service of a service provider network may include edge computing devices located at quantum hardware providers, wherein the edge computing devices are included as resources in the virtualized computing service. The edge computing device may function in part as additional resource hosts of the virtualized computing service. Compute instances, may be allocated to a customer on an edge computing device at a particular quantum hardware provider location. The compute instances implemented on the edge computing device may perform classical computing portions of a quantum computing hybrid algorithm, wherein a quantum computer, also located at the quantum hardware provider location with the edge computing device, executes quantum computing portions of the quantum computing hybrid algorithm. In some embodiments, a hybrid algorithm may be considered a quantum job, wherein quantum computing portions of the hybrid algorithm are quantum tasks of the overall quantum job. In some embodiments, such an edge computing device may be included at the quantum hardware provider location in addition to an edge computing device that implements a back-end API transport at the quantum hardware provider location. Also, in some embodiments, a single edge computing device at a quantum hardware provider may implement both a back-end API transport and compute instances that perform classical computing portions of a quantum computing hybrid algorithm.

In some embodiments, a quantum computing hybrid algorithm may include a classical compute portion comprising a ring of classical compute commands that determine what quantum circuit a command/quantum task is to be submitted to, and what parameters are to be supplied to the selected quantum circuit. Also, the classical compute portion of the hybrid algorithm may receive results from the quantum task executed on the quantum computer and then decide a subsequent quantum circuit and/or a subsequent command/quantum task that is to be sent to the quantum computer, and what parameters are to be supplied. For example, a first set of parameters sent to a quantum circuit may be modified based on the results received from the quantum circuit and a modified set of parameters, that have been modified based on the results, may then be sent back to the quantum circuit. Also, the results may prompt a different or modified quantum circuit to be used for a subsequent command/quantum task. In some embodiments, 100s, 1,000s, 1,000,000s of such iterations may be performed. In some embodiments, low latencies between the classical computer and the quantum computer may be necessary to efficiently execute such hybrid algorithms. In some embodiments, executing a classical compute portion of the hybrid algorithm on an edge computing device physically located in close proximity to the quantum computer may reduce such latencies such that hybrid algorithms not previously possible may be executed.

Also, in some embodiments, a customer may be provisioned multiple compute instances on a given edge computing device, wherein different ones of the compute instances (e.g., virtual machines) perform different hybrid algorithms or different classical compute tasks of a same hybrid algorithm. In some embodiments, a virtualized computing service may automatically scale up or down resources allocated to a compute instance to perform a classical portion of a hybrid algorithm. Also, the virtualized computing service may automatically scale a number of compute instances allocated to a customer based on required resources to execute a hybrid algorithm. For example, in some embodiments, a customer may be allocated a cluster of compute instances implemented on one or more edge computing devices located at a quantum hardware provider location. In some embodiments, some classical compute tasks of a classical compute portion of a hybrid algorithm may be performed by other compute instances of the virtualized computing service that are located in a data center and connected to the edge computing device via a high-speed connection, such as a non-public dedicated physical network link, such as a direct connection.

Figure 12:
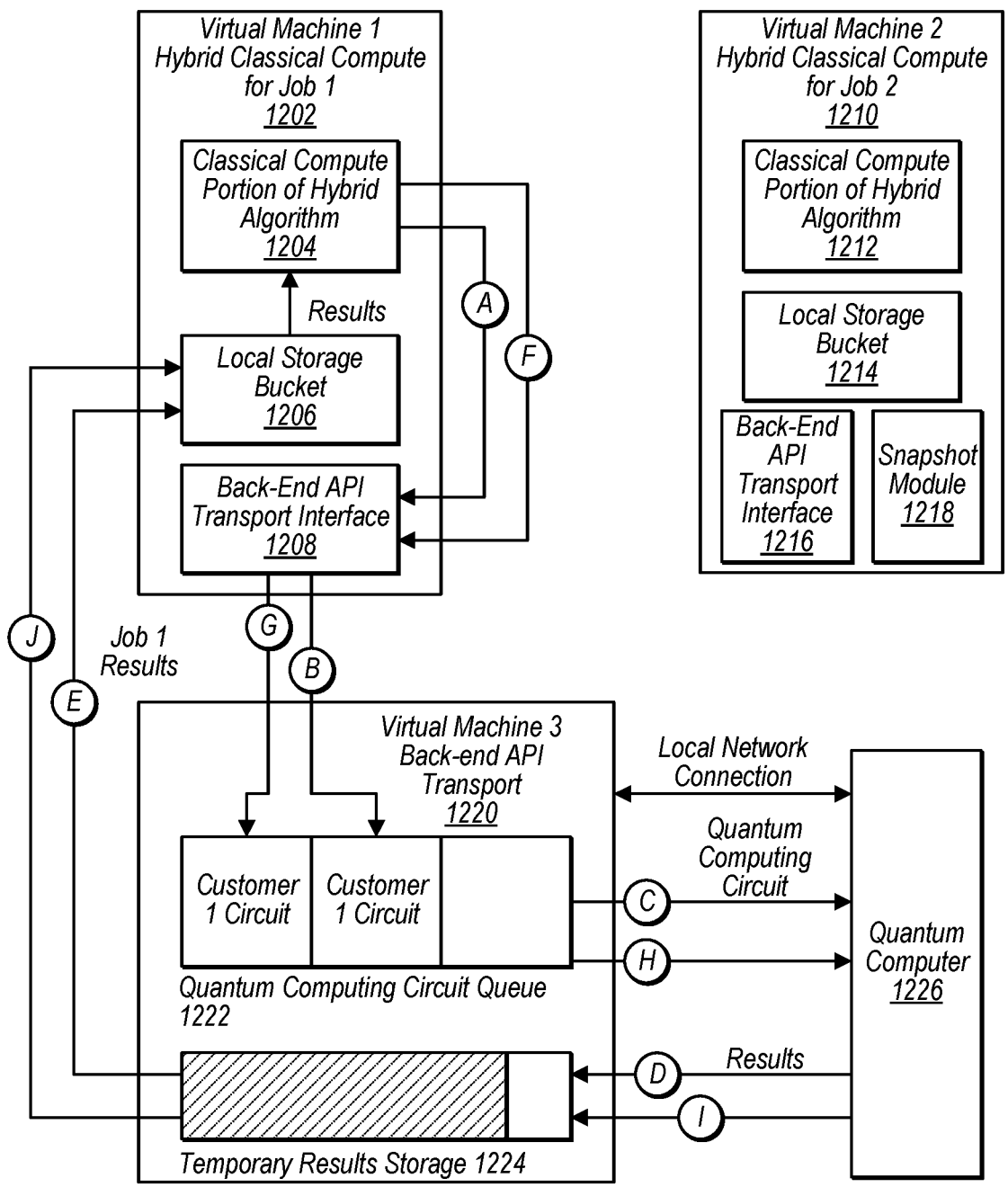
FIG. 12, illustrates example interactions between a classical computer implemented on an edge computing device of a quantum computing service, located at a quantum hardware provider location, and a quantum computer at the quantum hardware provider location, according to some embodiments.

FIG. 12, illustrates example interactions between a classical computer implemented on an edge computing device of a quantum computing service, located at a quantum hardware provider location, and a quantum computer at the quantum hardware provider location, according to some embodiments.

FIG. 12 illustrates a first virtual machine 1202 and a second virtual machine 1210. In some embodiments, VM 1202 and VM 1210 may be two virtual machines implemented on an edge computing device located at a quantum hardware provider. Also, VM 1220 could also be implemented on the same edge computing device at the quantum hardware provider, or may be implemented on a separate edge computing device at the quantum hardware provider. In some embodiments, VM 1202 and VM 1210 may be allocated to the same customer to perform two different jobs of a hybrid algorithm or multiple hybrid algorithms. Also, in some embodiments, an edge computing device at a quantum hardware provider location may support multi-tenancy, and VM 1202 and VM 1210 may be allocated to different customers.

In some embodiments, VM 1202 comprises an application/environment/module 1204 that executes a classical compute portion of a hybrid algorithm. Also, VM 1202 may include a local storage bucket 1206 that accesses results data stored in a memory of the edge computing device. Additionally, VM 1202 includes a back-end API transport interface 1208 that coordinates with virtual machine 3 back-end API transport 1220 to submit quantum computing tasks to the back-end API transport. The back-end API transport 1220 may include a quantum computing circuit queue 1222 and temporary results storage 1224, similar to as described in FIG. 12. Virtual machine 3 that implements back-end API transport 1220 may coordinate scheduling quantum computing tasks submitted from VM 1202 to be executed on quantum computer 1226 that is co-located at a quantum hardware provider facility with one or more edge computing devices that implement VMs 1202, 1210, and 1220.

In some embodiments, VM 1210 may include similar components as VM 1202. For example, VM 1210 may include classical compute application/environment/module 1212, local storage bucket 1214, and back-end API transport interface 1216. In some embodiments, VM 1202 and/or VM 1210 may include a snapshot module 1218, that causes snapshots of intermediate results of the execution of a hybrid algorithm on quantum computer 1226 to be stored as snapshots. The snapshots may be stored to a remote data storage service.

In some embodiments, at "step A" classical compute module 1204 may submit a quantum task/command to back-end API transport interface 1208. This may cause, at "step B", the quantum task and/or associated quantum circuit to be added to quantum computing circuit queue 1222. Then, at "step C", the back-end API transport 1220 may cause the job to be submitted to quantum computer 1226. At "step D", the back-end API transport 1220 may receive the results of executing the quantum task and at "step E" make a locally stored version of the results available to the classical compute module 1204 via local storage bucket 1206. The classical compute module 1204 may then use the results to generate a next command/quantum task and at "step F" submit the next command/quantum task to the back-end API transport interface 1208, which at "step G" may cause the next quantum task/quantum circuit to be added to the quantum computing circuit queue 1222. At "step H" the back-end API transport 1220 may cause the next quantum task/command to be executed on the quantum computer 1226 and at "step I" results may be returned to the back-end API interface 1220. At "step J" the results may be made available to the classical computing module 1204 via local storage bucket 1206. In some embodiments, this process may be repeated 100s, 1,000s, or 10,000s of times, etc. until one or more thresholds are met, such as the completion of an optimization problem.

Figure 13:
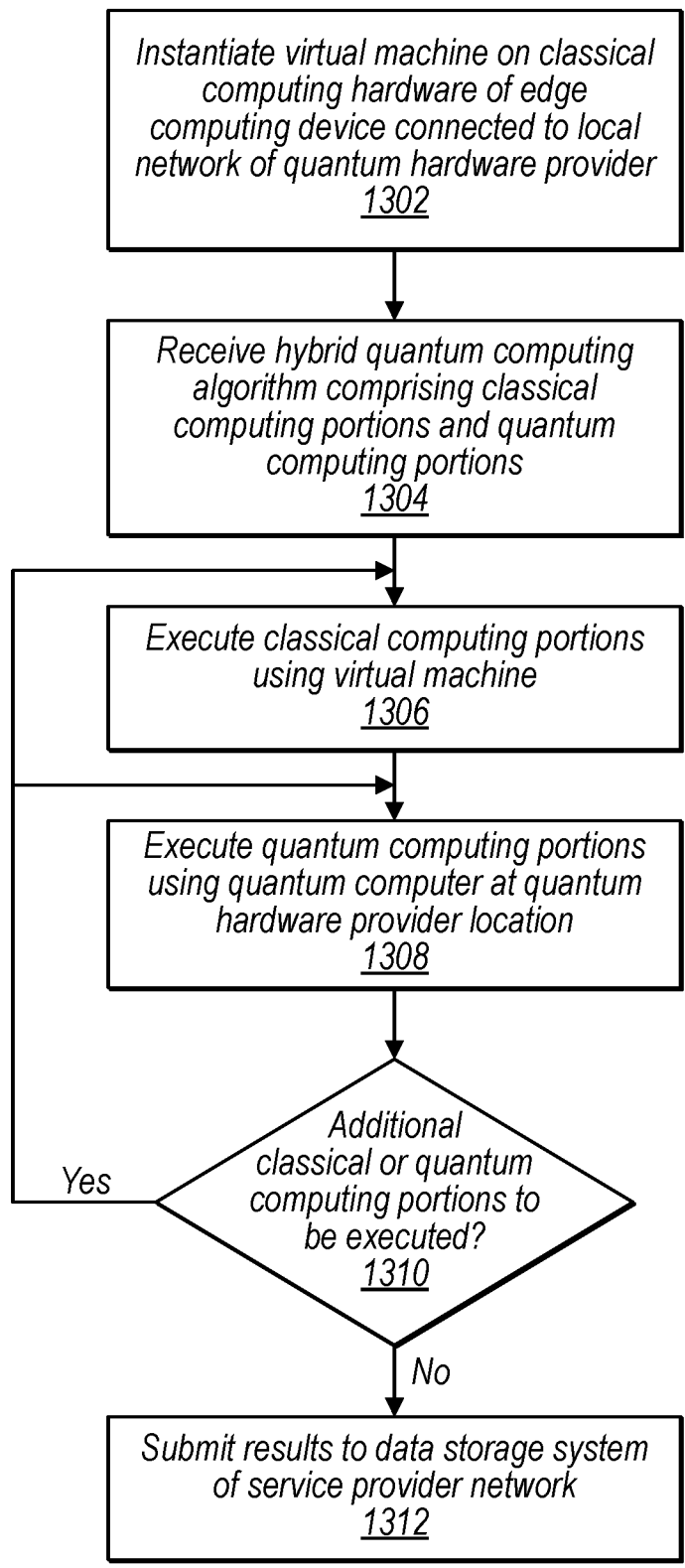
FIG. 13 illustrates an example process for executing a hybrid algorithm using an edge computing device of a quantum computing service, located at a quantum hardware provider location, according to some embodiments.

FIG. 13 illustrates an example process for executing a hybrid algorithm using an edge computing device of a quantum computing service, located at a quantum hardware provider location, according to some embodiments.

At 1302, the quantum computing service causes a virtual machine to be instantiated on classical computing hardware of an edge computing device physically located at quantum hardware provider location and connected to a local network of the quantum hardware provider.

At 1304, the quantum computing service receives a hybrid quantum computing algorithm (e.g., quantum job) comprising classical computing portions and quantum computing portions.

At 1306, the quantum computing service causes the classical computing portions of the hybrid algorithm to be executed on the instantiated virtual machine. Note that in some embodiments, a bare-metal instance may be used in place of a virtual machine.

At 1308, the quantum computing service executes quantum computing portions using quantum computer at quantum hardware provider location.

At 1310, the virtual machine executing the hybrid algorithm determines whether there are additional classical or quantum computing portions to be executed. If so, steps 1306 and/or 1308 are repeated. If not, at 1312, the quantum computing service submits results to a data storage system of service provider network.

Illustrative Computer System

Figure 14:
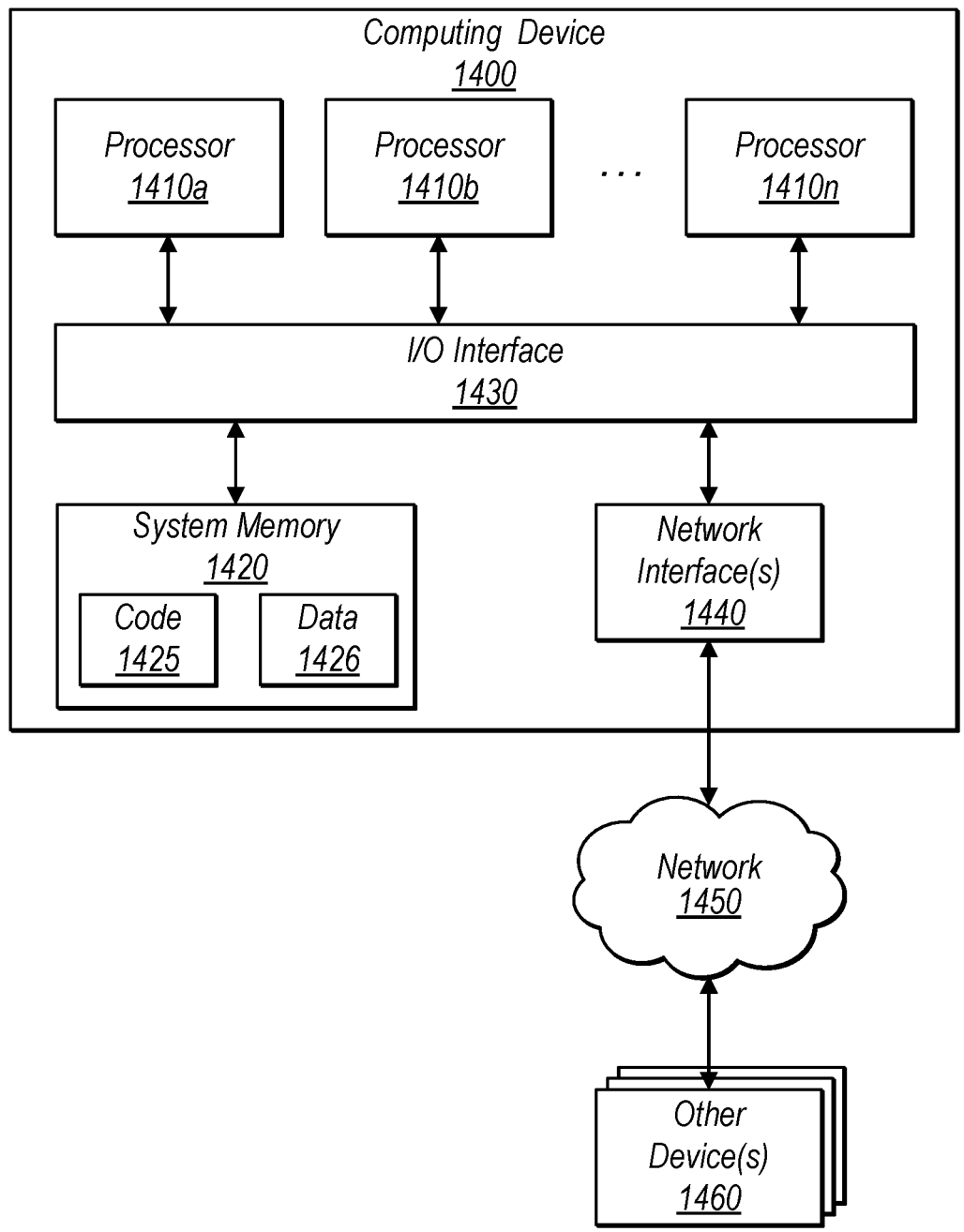
FIG. 14 is a block diagram illustrating an example classical computing device that may be used in at least some embodiments.

FIG. 14 is a block diagram illustrating an example computing device that may be used in at least some embodiments.

FIG. 14 illustrates such a general-purpose computing device 1400 as may be used in any of the embodiments described herein. In the illustrated embodiment, computing device 1400 includes one or more processors 1410 coupled to a system memory 1420 (which may comprise both non-volatile and volatile memory modules) via an input/output (I/O) interface 1430. Computing device 1400 further includes a network interface 1440 coupled to I/O interface 1430.

In various embodiments, computing device 1400 may be a uniprocessor system including one processor 1410, or a multiprocessor system including several processors 1410 (e.g., two, four, eight, or another suitable number). Processors 1410 may be any suitable processors capable of executing instructions. For example, in various embodiments, processors 1410 may be general-purpose or embedded processors implementing any of a variety of instruction set architectures (ISAs), such as the x86, PowerPC, SPARC, or MIPS ISAs, or any other suitable ISA. In multiprocessor systems, each of processors 1410 may commonly, but not necessarily, implement the same ISA. In some implementations, graphics processing units (GPUs) may be used instead of, or in addition to, conventional processors.

System memory 1420 may be configured to store instructions and data accessible by processor(s) 1410. In at least some embodiments, the system memory 1420 may comprise both volatile and non-volatile portions; in other embodiments, only volatile memory may be used. In various embodiments, the volatile portion of system memory 1420 may be implemented using any suitable memory technology, such as static random-access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 1420 as code 1425 and data 1426.

In some embodiments, I/O interface 1430 may be configured to coordinate I/O traffic between processor 1410, system memory 1420, and any peripheral devices in the device, including network interface 1440 or other peripheral interfaces such as various types of persistent and/or volatile storage devices. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. Also, in some embodiments some or all of the functionality of I/O interface 1430, such as an interface to system memory 1420, may be incorporated directly into processor 1410.

Network interface 1440 may be configured to allow data to be exchanged between computing device 1400 and other devices 1460 attached to a network or networks 1450, such as other computer systems or devices as illustrated in FIG. 1 through FIG. 13, for example. In various embodiments, network interface 1440 may support communication via any suitable wired or wireless general data networks, such as types of Ethernet network, for example. Additionally, network interface 1440 may support communication via telecommunications/telephony networks such as analog voice networks or digital fiber communications networks, via storage area networks such as Fibre Channel SANs, or via any other suitable type of network and/or protocol.

In some embodiments, system memory 1420 may represent one embodiment of a computer-accessible medium configured to store at least a subset of program instructions and data used for implementing the methods and apparatus discussed in the context of FIG. 1 through FIG. 13. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 1400 via I/O interface 1430. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 1400 as system memory 1420 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 1440. Portions or all of multiple computing devices such as that illustrated in FIG. 14 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system comprising:
    one or more computing devices of a service provider network configured to implement a quantum computing service,
    wherein the one or more computing devices that implement the quantum computing service are further configured to implement:
        a priority access control plane for the quantum computing service; and
        a plurality of quantum task queues for the quantum computing service,
    wherein the priority access control plane is configured to:
        assign respective priorities to respective quantum tasks included in, or to be included in, the plurality of quantum task queues based, at least in part, on respective quality of service (QOS) guarantees for the respective quantum tasks;
        determine, prior to completion of a given quantum task, a next one of the plurality of quantum task queues from which a next quantum task is to be selected from for execution based, at least in part, on past resource usage information and respective quality of service (Qos) resource allocation distribution targets for the plurality of quantum task queues;
    wherein the one or more computing devices that implement the quantum computing service are further configured to:
        submit, upon capacity becoming available, the next quantum task for execution from the determined next quantum task queue;
    wherein the quantum tasks are of variable time durations, such that some quantum tasks require more time to execute than other ones of the quantum tasks, and
    wherein the determining of the next quantum task queue from which the next quantum task is to be selected from for execution is performed out-of-band such that execution of the next quantum task is not delayed from proceeding to execution, when capacity becomes available, due to a time required to perform the determining of the next quantum task queue from which the next quantum task is to be selected from for execution.

2. The system of claim 1, further comprising:
    one or more edge computing devices of the provider network located at one or more respective locations of one or more quantum hardware providers;
    wherein the quantum computing service is configured to:
        submit the next quantum task to a respective one of the one or more edge computing devices for execution via a quantum hardware device of a respective one of the one or more quantum hardware providers.

3. The system of claim 1, further comprising:
    a quantum hardware device included in the service provider network, wherein the quantum computing service is configured to:
    submit the next quantum task to the quantum hardware device of the service provider network for execution.

4. The system of claim 1, wherein the quantum computing service is configured to:
    receive individual quantum tasks from clients of the quantum computing service; and
    receive quantum jobs from clients of the quantum computing service, wherein a quantum job comprises a plurality of quantum tasks, and
    wherein the priority access control plane is configured to:
        determine prioritization of the individual quantum tasks and the quantum jobs such that:
            a quality-of-service guarantee associated with the respective quantum jobs is enforced when executing quantum tasks of the respective quantum jobs; and
            the individual quantum tasks are executed according to a quality of service guarantee for quantum tasks belonging to a solo task type.

5. The system of claim 1, wherein:
    the quantum computing service is configured to attach access tokens to the quantum tasks; and
    to update the respective priorities of the quantum tasks, the priority access control plane is configured to update one or more priorities assigned to the access tokens.

6. The system of claim 5, wherein:
    to update a priority of a given quantum job comprising a plurality of quantum tasks, the access control plane is configured to update a priority of an access token for the given quantum job, wherein the access tokens for the given quantum job are attached to quantum tasks for the given quantum job.

7. A method of managing quantum tasks for a quantum computing service, the method comprising:
    assigning respective priorities to respective quantum tasks included in, or to be included in, a plurality of quantum task queues of the quantum computing service based, at least in part, on respective quality of service (QOS) guarantees for the respective quantum tasks;
    determining, prior to completion of a given quantum task, a next one of the plurality of quantum task queues from which a next quantum task is to be selected from for execution based, at least in part, on past resource usage information and respective quality of service (QOS) resource allocation distribution targets for the plurality of quantum task queues;
    submitting, upon capacity becoming available, the next quantum task for execution from the determined next quantum task queue wherein said determining the next quantum task queue from which the next quantum task is to be selected from for execution is performed out-of-band such that execution of the next quantum task is not delayed, when capacity becomes available, due to performing said determining the next quantum task queue from which the next quantum task is to be selected from for execution.

8. The method of claim 7, further comprising:
attaching access tokens to the quantum tasks,
wherein said assigning the respective priorities to the respective quantum tasks is based upon priorities for one or more respective types of access tokens attached to the respective quantum tasks.

9. The method of claim 8, wherein quantum tasks with different associated access token types are included in different ones of the plurality of quantum task queues of the quantum computing service.

10. The method of claim 9, wherein the respective types of access tokens attached to the quantum tasks included in the plurality of quantum task queues comprise:
a quantum job access token type; and
a solo quantum task access token type,
the method further comprising:
increasing, once a first quantum task for a given quantum job has been submitted for execution, a priority of other quantum tasks of the quantum job via increasing a priority associated with an access token type related to the given quantum job.

11. The method of claim 7, wherein the quantum tasks comprise simulation quantum tasks and wherein execution of the simulation quantum tasks comprises simulating a quantum program or quantum circuit via a classical computing simulator.

12. The method of claim 7, wherein the quantum tasks comprise quantum circuits and execution of the next quantum task comprises executing a quantum circuit of the next quantum task on a quantum computing device.

13. The method of claim 7, further comprising:
implementing a quantum job control plane configured to:
generate quantum tasks for respective quantum jobs submitted to the quantum computing service; and
attach quantum job type access tokens to the quantum tasks, wherein the attached quantum job type access tokens indicate a respective quantum job to which the attached quantum tasks belongs.

14. The method of claim 7, wherein the quantum tasks are of variable time durations, such that some quantum tasks included in the plurality of quantum task queues require more time to execute than other ones of the quantum tasks included in the plurality of quantum task queues.

15. The method of claim 14, wherein the quantum tasks included in the plurality of quantum task queues require different amounts of time to execute due to one or more of:
a number of shots required to be performed for the quantum task;
a size of a quantum circuit for the quantum task; or
an amount of time required to transition a quantum hardware device from a configuration used for a preceding quantum circuit for a preceding quantum task to a configuration to be used for the quantum circuit for the next quantum task.

16. The method of claim 7, wherein:
the next quantum task is submitted to a respective one of one or more edge computing devices of a service provider network comprising the quantum computing service, wherein the one or more edge computing devices are located at a quantum hardware provider location, and wherein the one or more edge computing devices submit the next quantum task for execution on a quantum hardware device of the quantum hardware provider.

17. The method of claim 7, wherein:
the next quantum task is submitted to a quantum hardware device of a service provider network comprising the quantum computing service.

18. One or more non-transitory, computer-readable, media storing program instructions, that when executed on or across one or more processors, cause the one or more processors to:
assign respective priorities to respective quantum tasks included in, or to be included in, a plurality of quantum task queues of a quantum computing service based, at least in part, on respective quality of service (QOS) guarantees for the respective quantum tasks;
determine, prior to completion of a given quantum task, a next one of the plurality of quantum task queues from which a next quantum task is to be selected from for execution based, at least in part, on past resource usage information and respective quality of service (QOS) resource allocation distribution targets for the plurality of quantum task queues; and
cause, upon capacity becoming available, the next quantum task to be submitted for execution from the determined next quantum task queue,
wherein said determining the next quantum task queue from which the next quantum task is to be selected from for execution is performed out-of-band such that execution of the next quantum task is not delayed, when capacity becomes available, due to performing said determining the next quantum task queue from which the next quantum task is to be selected from for execution.

19. The one or more non-transitory, computer-readable, media of claim 18, wherein:
the given quantum task is a preceding quantum task;
a current quantum task is currently being executed; and
the next quantum task queue from which the next quantum task is to be selected from is determined prior to the current quantum task being submitted for execution.

20. The one or more non-transitory, computer readable, media of claim 18, wherein the plurality of quantum task queues comprises a plurality of queues for a plurality of quality of service levels, and
wherein, the program instructions, when executed on or across the one or more processors, cause the one or more processors to:
update respective priorities for the plurality of queues for the plurality of quality-of-service levels such that at least one of the quality-of-service level queues has a higher priority than other ones of the quality-of-service level queues.

* * * * *